United States Patent
Lu

(10) Patent No.: US 12,118,263 B2
(45) Date of Patent: Oct. 15, 2024

(54) WIRELESS PROJECTION METHOD, MOBILE DEVICE, AND COMPUTER-READABLE STORAGE MEDIUM

(71) Applicant: Huawei Technologies Co., Ltd., Shenzhen (CN)

(72) Inventor: Feng Lu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/251,119

(22) PCT Filed: Oct. 20, 2021

(86) PCT No.: PCT/CN2021/124895
§ 371 (c)(1),
(2) Date: Apr. 28, 2023

(87) PCT Pub. No.: WO2022/089271
PCT Pub. Date: May 5, 2022

(65) Prior Publication Data
US 2023/0385008 A1  Nov. 30, 2023

(30) Foreign Application Priority Data
Oct. 30, 2020 (CN) .......................... 202011198023.X

(51) Int. Cl.
*G06F 3/14* (2006.01)
*H04M 1/72412* (2021.01)
*H04M 1/72427* (2021.01)

(52) U.S. Cl.
CPC .......... *G06F 3/1423* (2013.01); *G06F 3/1454* (2013.01); *H04M 1/72412* (2021.01); *H04M 1/72427* (2021.01)

(58) Field of Classification Search
CPC ................ G06F 3/1423; G06F 3/1454; H04M 1/72412; H04M 1/72427; H04M 1/72469;
(Continued)

(56) References Cited

U.S. PATENT DOCUMENTS 11,778,006 B2   10/2023  Huang et al.
2014/0372621 A1*  12/2014  Jiang ...................... H04L 65/40
                                                                709/228
(Continued)

FOREIGN PATENT DOCUMENTS

CN          103338139 A       10/2013
CN          103618941 A        3/2014
(Continued)

*Primary Examiner* — Amit Chatly
(74) *Attorney, Agent, or Firm* — Conley Rose, P.C.

(57) ABSTRACT

A mobile device runs a first application in the foreground, and performs wireless projection onto an electronic device in a first wireless projection mode. The mobile device includes a processor, a memory, and a computer program stored in the memory. When the computer program is executed by the processor, the mobile device is enabled to perform: After it is detected that the first application belongs to a first-type application, automatically outputting first prompt information, where the first prompt information is used for giving a prompt for switching the first wireless projection mode to a second wireless projection mode; or automatically switching the first wireless projection mode to a second wireless projection mode, and performing wireless projection onto the electronic device in the second wireless projection mode.

16 Claims, 26 Drawing Sheets

(58) Field of Classification Search
CPC ......... H04N 21/4122; H04N 21/43076; H04N 21/4781; G09G 2354/00; G09G 2370/16
See application file for complete search history.

(56) References Cited

U.S. PATENT DOCUMENTS

| | | |
|---|---|---|
| 2022/0004315 A1 | 1/2022 | Zhang et al. |
| 2022/0224968 A1 | 7/2022 | Wang et al. |
| 2022/0391161 A1 | 12/2022 | Fan et al. |

FOREIGN PATENT DOCUMENTS

| | | | |
|---|---|---|---|
| CN | 109120970 A | | 1/2019 |
| CN | 109660842 A | | 4/2019 |
| CN | 110049368 A | | 7/2019 |
| CN | 110109636 A | | 8/2019 |
| CN | 110248224 A | * | 9/2019 |
| CN | 110381195 A | | 10/2019 |
| CN | 110536008 A | | 12/2019 |
| CN | 110740288 A | | 1/2020 |
| CN | 111628847 A | | 9/2020 |
| KR | 101727569 B1 | | 4/2017 |
| WO | 2020014880 A1 | | 1/2020 |

* cited by examiner

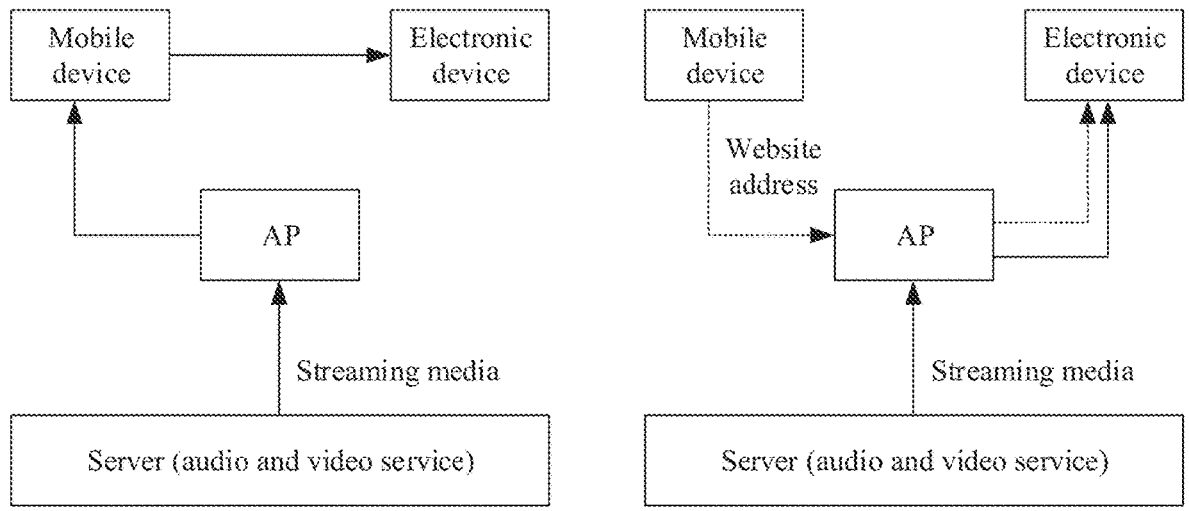
FIG. 1A
FIG. 1B
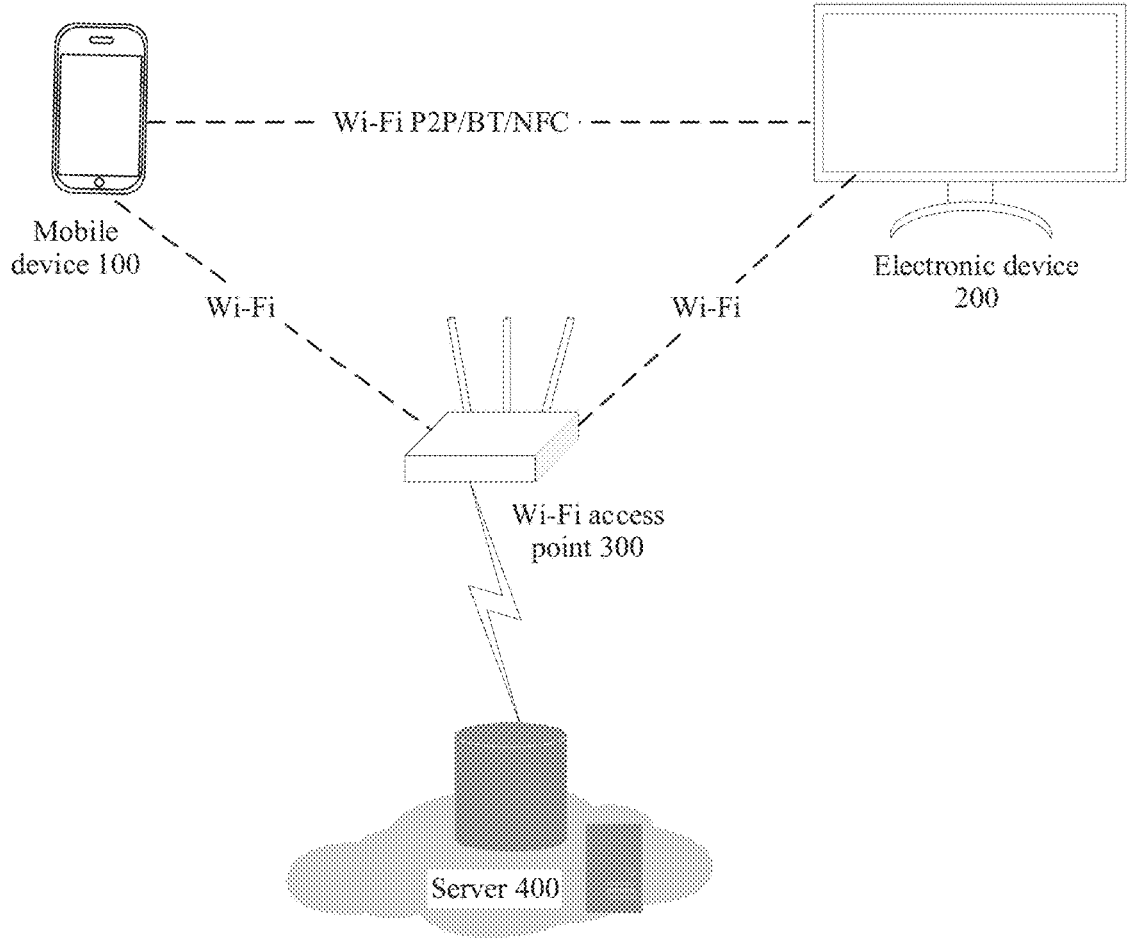
FIG. 2

WIRELESS PROJECTION METHOD, MOBILE DEVICE, AND COMPUTER-READABLE STORAGE MEDIUM

CROSS-REFERENCE TO RELATED APPLICATIONS

This is a U.S. National Stage of International Patent Application No. PCT/CN2021/124895 filed on Oct. 20, 2021, which claims priority to Chinese Patent Application No. 202011198023.X filed on Oct. 30, 2020. Both of the aforementioned applications are hereby incorporated by reference in their entireties.

TECHNICAL FIELD

This disclosure relates to the field of projection technologies, and in particular, to a wireless projection method, a mobile device, and a computer-readable storage medium.

BACKGROUND

Wireless projection enables a mobile device, such as a mobile phone or a tablet, to project local or network multimedia content onto an electronic device that has an audio or video playing capability, such as a PC or a smart screen, and play the multimedia content on the electronic device. Typical wireless projection includes mirroring projection (for example, miracast), online projection (for example, DLNA), and the like.

In mirroring projection, the electronic device may not need to access the internet or a local area network. However, in an entire process, both the mobile device and the electronic device need to process projected data in real time. For example, the mobile device needs to encode and send the projected data in real time, and the electronic device needs to receive and decode the projected data in real time. As a result, there are a large quantity of participating devices, a delay of the projected data is large, and a projection effect is easily affected by the mobile device. In online projection, the mobile device participates only in initial website address transmission, but does not participate in a subsequent process. In this way, a delay of projected data is small, a projection effect is not easily affected by the mobile device, and the projection effect is good. However, the electronic device needs to access the internet or a local area network.

SUMMARY

After long-term research, it is founded that different applications focus on different requirements, but a same projection mode is used in projection. This causes poor user experience. For example, a game application focuses on real-time performance, and has a high requirement on a low latency, but has a low requirement on audio-visual synchronization; and a video application (for example, Tencent Video) focuses on audio-visual synchronization, but has a low requirement on real-time performance, that is, has a low requirement on a low latency. However, if a same projection mode is used in projection, after a user switches between different applications, the same projection mode is suitable for an application before switching, but is not suitable for an application after switching. For example, after projecting an image of a mobile phone onto a smart television (which is also referred to as a large screen) through mirroring projection, the user opens a game application, and plays a game by using the mobile phone and the large screen together. In this case, a latency is low, and user experience is good. Then, the user switches the game application to a video application. In this case, audio-visual non-synchronization occurs, and user experience is poor.

To resolve the foregoing technical problem, considering features of mirroring projection and online projection, and requirements of different applications, this disclosure provides a wireless projection method, a mobile device, and a computer-readable storage medium, to automatically identify a type of a current application, automatically provide a suggestion, and automatically prompt a user whether to change a projection mode, or even automatically change a projection mode, so that a changed projection mode is most suitable for projection of the current application, thereby improving user experience. For example, after projecting an image of a mobile phone onto a large screen through mirroring projection, the user opens a game application, and plays a game by using the mobile phone and the large screen together. In this case, a scenario is automatically identified, it is determined that mirroring projection is a most suitable projection mode for the game application, and mirroring projection remains unchanged. Then, the user switches the game application to a video application (for example, Tencent Video). In this case, a scenario is automatically identified, it is determined that online projection is a most suitable projection mode for the video application, and the user is automatically prompted to change the projection mode, or even the current mirroring projection mode is automatically changed to the online projection mode. In this way, requirements of different applications and features of mirroring projection and online projection are considered, so that user experience is good.

According to a first aspect, this disclosure provides a mobile device. The mobile device runs a first application in the foreground, and the mobile device performs wireless projection onto an electronic device in a first wireless projection mode. The mobile device includes a processor, a memory, and a computer program, where the computer program is stored in the memory. When the computer program is executed by the processor, the mobile device is enabled to perform the following step: after it is detected that the first application belongs to a first-type application, automatically outputting, by the mobile device, first prompt information, where the first prompt information is used for giving a prompt for switching the first wireless projection mode to a second wireless projection mode; or automatically switching, by the mobile device, the first wireless projection mode to a second wireless projection mode, and performing wireless projection onto the electronic device in the second wireless projection mode; or automatically switching, by the mobile device, the first wireless projection mode to a second wireless projection mode, and performing, in the second wireless projection mode, wireless projection onto one or more electronic devices that support the second wireless projection mode and that are detected by the mobile device. In this way, the mobile device can automatically identify a type of an application that is being run in the foreground, and automatically prompt a user whether to change a projection mode, or automatically change a projection mode, so that a changed projection mode is most suitable for projection of the current application. Therefore, requirements of different applications and features of mirroring projection and online projection are considered, so that user experience is improved. In this solution, a specific execution body is an operating system currently running on the mobile device, or a default system-level application (for example, a system-level application that is started immediately after the mobile device is powered on) on the mobile device.

A third solution of the first aspect is illustrated by using an example. For example, there are an electronic device 1, an electronic device 2, and an electronic device 3 around the mobile device. The mobile device runs the first application, and the mobile device performs wireless projection onto the electronic device 1 in the first wireless projection mode. After it is detected that the first application belongs to the first-type application, the mobile device automatically switches the first wireless projection mode to the second wireless projection mode, and the mobile device disconnects wireless projection from the electronic device 1, and performs wireless projection onto at least one of the electronic device 2 or the electronic device 3 in the second wireless projection mode. Alternatively, after it is detected that the first application belongs to the first-type application, the mobile device automatically switches the first wireless projection mode to the second wireless projection mode, and the mobile device performs wireless projection onto at least one of the electronic device 1, the electronic device 2, or the electronic device 3 in the second wireless projection mode.

According to the first aspect, after the automatically outputting, by the mobile device, the first prompt information, the mobile device further performs the following steps: detecting a first user input, where the first user input is used for switching the first wireless projection mode to the second wireless projection mode; in response to the first user input, automatically outputting, by the mobile device, an identifier or identifiers of the one or more electronic devices, where the electronic device is an electronic device that supports the second wireless projection mode and that is detected by the mobile device; detecting a second user input, where the second user input is used for selecting an identifier of an electronic device from the identifier or identifiers of the one or more electronic devices; and in response to the second user input, switching, by the mobile device, the first wireless projection mode to the second wireless projection mode, and performing projection onto the selected electronic device in the second wireless projection mode. In this way, after the mobile device outputs the prompt information, the user is provided with an opportunity to select whether to switch the projection mode, and select a projection mode used after switching and an electronic device that accepts projection. The user can perform selection based on a prompt.

According to either the first aspect or the foregoing implementation of the first aspect, the mobile device further performs the following step: after it is detected that a second application that belongs to a second-type application is started, or after it is detected that a second application that belongs to a second-type application is switched to run in the foreground, automatically outputting, by the mobile device, second prompt information, where the second prompt information is used for giving a prompt for switching the second wireless projection mode to the first wireless projection mode; or automatically switching, by the mobile device, the second wireless projection mode to the first wireless projection mode, and performing wireless projection onto the electronic device in the first wireless projection mode. In this way, after the type of the application that is being run in the foreground of the mobile device changes again, the mobile device automatically identifies the type, and automatically prompts the user whether to change the projection mode, or automatically changes the projection mode, so that a changed projection mode is most suitable for projection of the current application. This improves user experience.

According to any one of the first aspect or the foregoing implementations of the first aspect, the mobile device further performs the following step: after it is detected that the first application is a third-type application, automatically switching, by the first application of the mobile device, the first wireless projection mode to the second wireless projection mode, and performing wireless projection onto the electronic device in the second wireless projection mode; or automatically switching, by the first application of the mobile device, the first wireless projection mode to the second wireless projection mode, and performing, in the second wireless projection mode, wireless projection onto the one or more electronic devices that support the second wireless projection mode and that are detected by the mobile device. In this way, after the type of the application that is being run in the foreground of the mobile device changes, the mobile device automatically identifies the type, and automatically prompts the user whether to change the projection mode, or automatically changes the projection mode, so that a changed projection mode is most suitable for projection of the current application. This improves user experience.

According to any one of the first aspect or the foregoing implementations of the first aspect, the mobile device further performs the following step: after it is detected that the first application that belongs to the first-type application is switched to run in the foreground, or after it is detected that a third application that belongs to the first-type application is started, or after it is detected that a third application that belongs to the first-type application is switched to run in the foreground, automatically outputting, by the mobile device, third prompt information, where the third prompt information is used for giving a prompt for switching the first wireless projection mode to the second wireless projection mode; or automatically switching, by the mobile device, the first wireless projection mode to the second wireless projection mode, and performing wireless projection onto the electronic device in the second wireless projection mode. In this way, after the type of the application that is being run in the foreground of the mobile device changes back, the mobile device automatically identifies the type, and automatically prompts the user whether to change the projection mode back, or automatically changes the projection mode back, so that a changed projection mode is most suitable for projection of the current application. This improves user experience.

According to any one of the first aspect or the foregoing implementations of the first aspect, after the automatically outputting, by the mobile device, first prompt information, the mobile device further performs the following steps: detecting a first user input, where the first user input is used for switching the first wireless projection mode to the second wireless projection mode; and in response to the first user input, automatically switching, by the mobile device, the first wireless projection mode to the second wireless projection mode, and performing wireless projection onto the electronic device in the second wireless projection mode; or automatically switching, by the mobile device, the first wireless projection mode to the second wireless projection mode, and performing, in the second wireless projection mode, wireless projection onto the one or more electronic devices that support the second wireless projection mode and that are detected by the mobile device. In this way, another projection mode changing solution is provided. This can also improve user experience.

According to any one of the first aspect or the foregoing implementations of the first aspect, after it is detected that the first application belongs to the first-type application, the mobile device further performs the following step: after it is detected that the mobile device plays a network video by using the first application, automatically outputting, by the mobile device, first prompt information, where the first prompt information is used for giving a prompt for switching the first wireless projection mode to the second wireless projection mode; or automatically switching, by the mobile device, the first wireless projection mode to the second wireless projection mode, and performing wireless projection onto the electronic device in the second wireless projection mode; or automatically switching, by the mobile device, the first wireless projection mode to the second wireless projection mode, and performing, in the second wireless projection mode, wireless projection onto the one or more electronic devices that support the second wireless projection mode and that are detected by the mobile device. In this way, the mobile device also automatically prompts the user whether to change the projection mode, or automatically changes the projection mode, so that a changed projection mode is most suitable for projection of the current application. Therefore, requirements of different applications and features of mirroring projection and online projection are considered, so that user experience is improved.

According to any one of the first aspect or the foregoing implementations of the first aspect, the first-type application is a non-customized video application, the second-type application is a game application, and the third-type application is a customized video application; the first wireless projection mode is a mirroring projection mode, and the second wireless projection mode is an online projection mode; the one or more electronic devices include the electronic device, or the one or more electronic devices do not include the electronic device; and input forms of the first user input and the second user input include forms: a touch input and a voice input. In this way, the first application that provides a video service does not need to be improved, and it can be ensured that when the mobile device runs the first application, the mobile device prompts the user to change the current mirroring projection mode to the online projection mode, or even automatically changes the current mirroring projection mode to the online projection mode. This improves projection efficiency, and can ensure image quality of playing the network video by the electronic device. Therefore, optimal projection experience for the user is ensured, and costs can be reduced. In addition, after the mobile device changes the projection mode, the mobile device may continue to perform projection onto the original electronic device, or may perform projection onto another electronic device, to meet different requirements of the user.

According to any one of the first aspect or the foregoing implementations of the first aspect, the mirroring projection mode may be miracast formulated by the Wi-Fi Alliance, and the online projection mode may be DLNA.

According to any one of the first aspect or the foregoing implementations of the first aspect, the mobile device stores a whitelist. The whitelist is used for identifying which application belongs to the first-type application, and the whitelist includes one or more applications that belong to the first-type application. The whitelist is preset and can be updated.

According to any one of the first aspect or the foregoing implementations of the first aspect, the first prompt information includes but is not limited to an interface element displayed on a display, played audio, indicator blinking, a motor vibration, and the like.

According to a second aspect, a mobile device is provided. The mobile device performs wireless projection onto an electronic device in a first wireless projection mode. The mobile device includes a processor, a memory, and a computer program, where the computer program is stored in the memory. When the computer program is executed by the processor, the mobile device is enabled to perform the following step: after it is detected that a first application is started and the first application belongs to a first-type application, automatically outputting, by the mobile device, first prompt information, where the first prompt information is used for giving a prompt for switching the first wireless projection mode to a second wireless projection mode; or automatically switching, by the mobile device, the first wireless projection mode to a second wireless projection mode, and performing wireless projection onto the electronic device in the second wireless projection mode.

According to a third aspect, a wireless projection method is provided. The wireless projection method is applied to a mobile device. The mobile device includes a processor and a memory. The mobile device runs a first application in the foreground, and the mobile device performs wireless projection onto an electronic device in a first wireless projection mode. The method includes: after it is detected that the first application belongs to a first-type application, automatically outputting, by the mobile device, first prompt information, where the first prompt information is used for giving a prompt for switching the first wireless projection mode to a second wireless projection mode; or automatically switching, by the mobile device, the first wireless projection mode to a second wireless projection mode, and performing wireless projection onto the electronic device in the second wireless projection mode, or automatically switching, by the mobile device, the first wireless projection mode to a second wireless projection mode, and performing, in the second wireless projection mode, wireless projection onto one or more electronic devices that support the second wireless projection mode and that are detected by the mobile device.

According to the third aspect, after the automatically outputting, by the mobile device, first prompt information, the wireless projection method further includes: detecting a first user input, where the first user input is used for switching the first wireless projection mode to the second wireless projection mode; in response to the first user input, automatically outputting, by the mobile device, an identifier or identifiers of the one or more electronic devices, where the electronic device is an electronic device that supports the second wireless projection mode and that is detected by the mobile device; detecting a second user input, where the second user input is used for selecting an identifier of an electronic device from the identifier or identifiers of the one or more electronic devices; and in response to the second user input, switching, by the mobile device, the first wireless projection mode to the second wireless projection mode, and performing projection onto the selected electronic device in the second wireless projection mode. In this way, after the mobile device outputs the prompt information, a user is provided with an opportunity to select whether to switch the projection mode, and select a projection mode used after switching and an electronic device that accepts projection. The user can perform selection based on a prompt.

According to either the third aspect or the foregoing implementation of the third aspect, the wireless projection method further includes: after it is detected that a second application that belongs to a second-type application is started, or after it is detected that a second application that belongs to a second-type application is switched to run in the foreground, automatically outputting, by the mobile device, second prompt information, where the second prompt information is used for giving a prompt for switching the second wireless projection mode to the first wireless projection mode; or automatically switching, by the mobile device, the second wireless projection mode to the first wireless projection mode, and performing wireless projection onto the electronic device in the first wireless projection mode. In this way, after the type of the application that is being run in the foreground of the mobile device changes again, the mobile device automatically identifies the type, and automatically prompts the user whether to change the projection mode, or automatically changes the projection mode, so that a changed projection mode is most suitable for projection of the current application. This improves user experience.

According to any one of the third aspect or the foregoing implementations of the third aspect, the wireless projection method further includes: after it is detected that the first application is a third-type application, automatically switching, by the mobile device, the first wireless projection mode to the second wireless projection mode, and performing wireless projection onto the electronic device in the second wireless projection mode; or automatically switching, by the mobile device, the first wireless projection mode to the second wireless projection mode, and performing, in the second wireless projection mode, wireless projection onto the one or more electronic devices that support the second wireless projection mode and that are detected by the mobile device. In this way, after the type of the application that is being run in the foreground of the mobile device changes, the mobile device automatically identifies the type, and automatically prompts the user whether to change the projection mode, or automatically changes the projection mode, so that a changed projection mode is most suitable for projection of the current application. This improves user experience.

According to any one of the third aspect or the foregoing implementations of the third aspect, the wireless projection method further includes: after it is detected that the first application that belongs to the first-type application is switched to run in the foreground, or after it is detected that a third application that belongs to the first-type application is started, or after it is detected that a third application that belongs to the first-type application is switched to run in the foreground, automatically outputting, by the mobile device, third prompt information, where the third prompt information is used for giving a prompt for switching the first wireless projection mode to the second wireless projection mode; or automatically switching, by the mobile device, the first wireless projection mode to the second wireless projection mode, and performing wireless projection onto the electronic device in the second wireless projection mode. In this way, after the type of the application that is being run in the foreground of the mobile device changes back, the mobile device automatically identifies the type, and automatically prompts the user whether to change the projection mode back, or automatically changes the projection mode back, so that a changed projection mode is most suitable for projection of the current application. This improves user experience.

According to any one of the third aspect or the foregoing implementations of the third aspect, after the automatically outputting, by the mobile device, first prompt information, the wireless projection method further includes: detecting a first user input, where the first user input is used for switching the first wireless projection mode to the second wireless projection mode; and in response to the first user input, automatically switching, by the mobile device, the first wireless projection mode to the second wireless projection mode, and performing wireless projection onto the electronic device in the second wireless projection mode; or automatically switching, by the mobile device, the first wireless projection mode to the second wireless projection mode, and performing, in the second wireless projection mode, wireless projection onto the one or more electronic devices that support the second wireless projection mode and that are detected by the mobile device. In this way, another projection mode changing solution is provided. This can also improve user experience.

According to any one of the third aspect or the foregoing implementations of the third aspect, after it is detected that the first application belongs to the first-type application, the wireless projection method further includes: after it is detected that the mobile device plays a network video by using the first application, automatically outputting, by the mobile device, first prompt information, where the first prompt information is used for giving a prompt for switching the first wireless projection mode to the second wireless projection mode; or automatically switching, by the mobile device, the first wireless projection mode to the second wireless projection mode, and performing wireless projection onto the electronic device in the second wireless projection mode; or automatically switching, by the mobile device, the first wireless projection mode to the second wireless projection mode, and performing, in the second wireless projection mode, wireless projection onto the one or more electronic devices that support the second wireless projection mode and that are detected by the mobile device. In this way, the mobile device also automatically prompts the user whether to change the projection mode, or automatically changes the projection mode, so that a changed projection mode is most suitable for projection of the current application. Therefore, requirements of different applications and features of mirroring projection and online projection are considered, so that user experience is improved.

According to any one of the third aspect or the foregoing implementations of the third aspect, the first-type application is a non-customized video application, the second-type application is a game application, and the third-type application is a customized video application; the first wireless projection mode is a mirroring projection mode, and the second wireless projection mode is an online projection mode; the one or more electronic devices include the electronic device, or the one or more electronic devices do not include the electronic device; and input forms of the first user input and the second user input include forms: a touch input and a voice input. In this way, the first application that provides a video service does not need to be improved, and it can be ensured that when the mobile device runs the first application, the mobile device prompts the user to change the current mirroring projection mode to the online projection mode, or even automatically changes the current mirroring projection mode to the online projection mode. This improves projection efficiency, and can ensure image quality of playing the network video by the electronic device. Therefore, optimal projection experience for the user is ensured, and costs can be reduced. In addition, after the mobile device changes the projection mode, the mobile device may continue to perform projection onto the original electronic device, or may perform projection onto another electronic device, to meet different requirements of the user.

According to any one of the third aspect or the foregoing implementations of the third aspect, the mirroring projection mode may be miracast formulated by the Wi-Fi Alliance, and the online projection mode may be DLNA.

According to any one of the third aspect or the foregoing implementations of the third aspect, the mobile device stores a whitelist. The whitelist is used for identifying which application belongs to the first-type application, and the whitelist includes one or more applications that belong to the first-type application. The whitelist is preset and can be updated. The whitelist can be set, for example, added or deleted, by the user.

According to any one of the third aspect or the foregoing implementations of the third aspect, the first prompt information includes but is not limited to an interface element displayed on a display, played audio, indicator blinking, a motor vibration, and the like.

The third aspect and any implementation of the third aspect respectively correspond to the first aspect and any implementation of the first aspect. For technical effects corresponding to the third aspect and any implementation of the third aspect, refer to technical effects corresponding to the first aspect and any implementation of the first aspect. Details are not described herein again.

According to a fourth aspect, a wireless projection method is provided. The wireless projection method is applied to a mobile device. The mobile device includes a processor and a memory. The mobile device performs wireless projection onto an electronic device in a first wireless projection mode. The method includes: after it is detected that a first application is started and the first application belongs to a first-type application, automatically outputting, by the mobile device, first prompt information, where the first prompt information is used for giving a prompt for switching the first wireless projection mode to a second wireless projection mode; or automatically switching, by the mobile device, the first wireless projection mode to a second wireless projection mode, and performing wireless projection onto the electronic device in the second wireless projection mode.

According to a fifth aspect, this disclosure provides a wireless projection method. The wireless projection method is applied to a mobile device. The mobile device includes a processor and a memory. The mobile device performs wireless projection onto an electronic device in a first wireless projection mode. The wireless projection method includes: running, by the mobile device, a first application in the foreground; identifying, by the mobile device, a scenario corresponding to the application that is being run in the foreground; and notifying the electronic device of the scenario, so that the electronic device plays multimedia content by using a playing policy corresponding to the scenario.

According to a sixth aspect, an embodiment of this disclosure provides a projection method. The projection method is applied to an electronic device. The method may include: receiving, by the electronic device in a first wireless projection mode, multimedia content sent by a mobile device; receiving a scenario that is identified by the mobile device and that is sent by the mobile device; and playing the multimedia content by using a playing policy corresponding to the scenario.

According to a seventh aspect, this disclosure provides a computer-readable storage medium, including a computer program. When the computer program is run on a mobile device, the mobile device is enabled to perform the method according to any one of the third aspect, the fourth aspect, the fifth aspect, and the implementations of the third aspect.

According to an eighth aspect, this disclosure provides a computer program product. When the computer program product is run on a mobile device, the mobile device is enabled to perform the method according to any one of the third aspect, the fourth aspect, the fifth aspect, and the implementations of the third aspect.

According to the technical solutions provided in this disclosure, an improvement is made to a system side, and no adaptation needs to be performed by a third-party application. In addition, according to the technical solutions provided in this disclosure, an optimal projection mode is automatically selected based on a type of an application that is being run in the foreground, or even based on whether an application that is being run in the foreground plays a network video; or prompt information is automatically output, so that a user can perform autonomous selection. In this way, a projection effect of a mobile device is optimal, projection experience of the user is improved, costs are reduced, and projection efficiency is improved.

BRIEF DESCRIPTION OF DRAWINGS

FIG. 1A is a schematic diagram of a principle of sharing a network video by a mobile device with an electronic device based on mirroring projection;

FIG. 1B is a schematic diagram of a principle of sharing a network video by a mobile device with an electronic device based on online projection;

FIG. 2 is a schematic diagram of a scenario of a wireless projection method according to an embodiment of this disclosure;

DESCRIPTION OF EMBODIMENTS

Figure 3A:
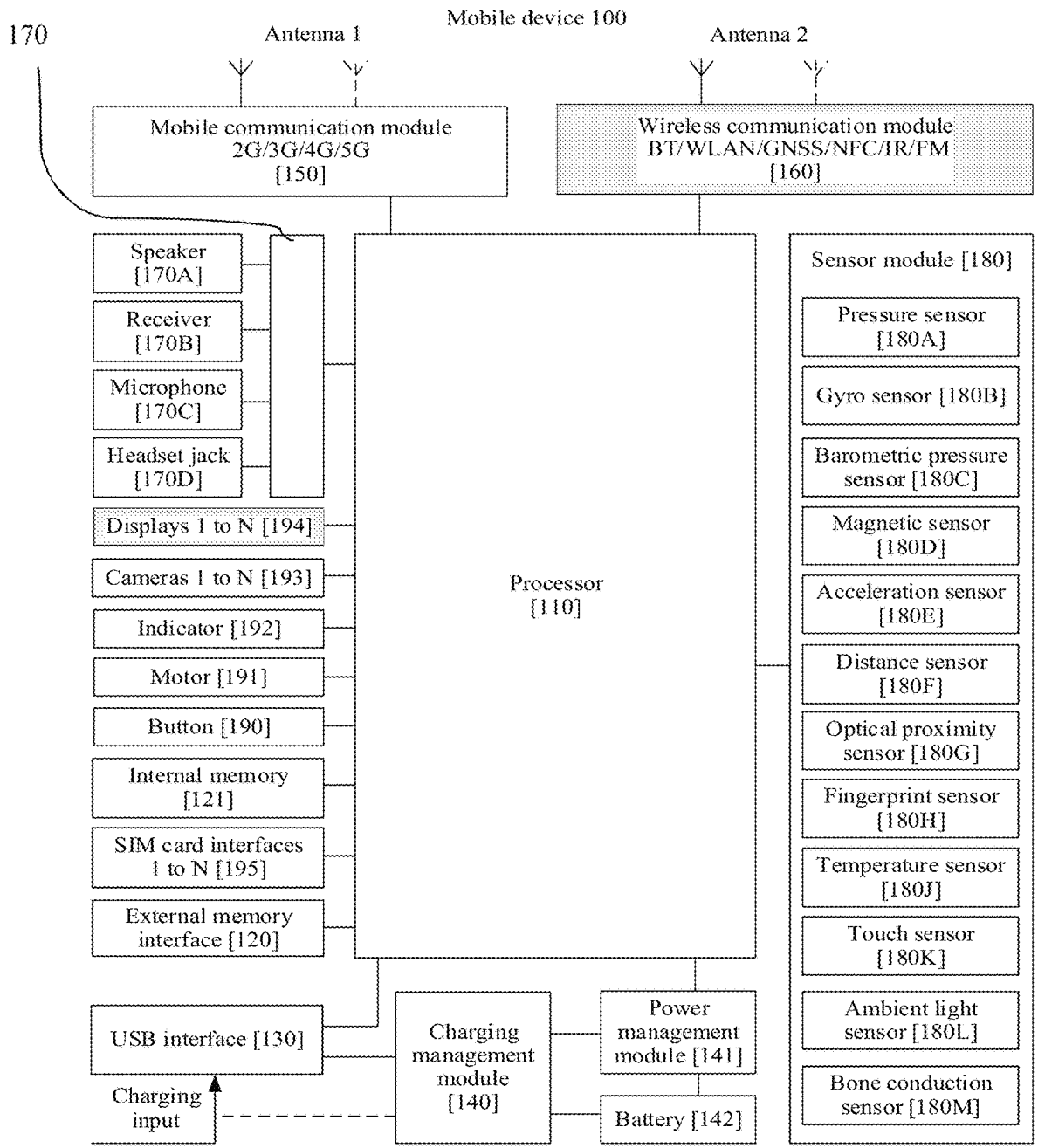
FIG. 3A is a schematic diagram of a hardware structure of a mobile device according to an embodiment of this disclosure.

The technical solutions in embodiments of this disclosure are clearly described in detail in the following with reference to the accompanying drawings. In descriptions of embodiments of this disclosure, "/" means "or", unless otherwise specified. For example, A/B may indicate A or B. "And/or" in this specification describes merely an association relationship for describing associated objects, and indicates that three relationships may exist. For example, A and/or B may indicate the following three cases: Only A exists, both A and B exist, and only B exists. In addition, in the descriptions of embodiments of this disclosure, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features.

In embodiments of this disclosure, the word "example", "for example", or the like is used to represent giving an example, an illustration, or a description. Any embodiment or design scheme described as "example" or "for example" in embodiments of this disclosure should not be explained as being more preferred or having more advantages than another embodiment or design scheme. Exactly, use of the word "example", "for example", or the like is intended to present a related concept in a specific manner.

A term "user interface (user interface, UI)" in the following embodiments of this disclosure is a medium interface for interaction and information exchange between an application or an operating system and a user, and implements conversion between an internal form of information and a form that can be accepted by the user. The user interface means that content presented on a mobile device or an electronic device that can be identified by the user. The content is parsed and rendered through interface source code written in a specific computer language such as Java or extensible markup language (extensible markup language, XML). The user interface is usually represented in a form of a graphical user interface (graphical user interface, GUI), and is a user interface that is related to a computer operation and that is displayed in a graphic manner. The graphical user interface may be a visual interface element such as text, an icon, a button, a menu, a tab, a text box, a dialog box, a status bar, a navigation bar, or a widget displayed on a display of the mobile device or the electronic device.

In embodiments of this disclosure, through wireless projection, content (for example, played multimedia content) displayed by the mobile device may be displayed on the electronic device (for example, the multimedia content continues to be played), and then the mobile device may continue to display the content, or may no longer display the content. Wireless projection may alternatively be replaced with another word, for example, multi-screen interaction. This is not limited in embodiments of this disclosure. The mobile device may also be referred to as an output end or a source end (source end), and the electronic device may also be referred to as an input end or a receiving end (sink end).

After wireless projection, the multimedia content displayed or played by the electronic device may include any one or more of the following: a video, text, a picture, a photo, audio, a table, or the like. For example, the multimedia content may be a movie, a TV series, a short video, a musical, or the like.

The multimedia content may be network multimedia content, or may be local multimedia content, or may be a combination of network multimedia content and local multimedia content. The network multimedia content is multimedia content obtained by the mobile device from a network, for example, a video obtained, when the mobile device runs a video application, by the mobile device from a server that provides an audio and video service. The local multimedia content is multimedia content locally stored or generated by the mobile device, for example, a picture or a table locally stored by the mobile device.

First, two projection modes in the embodiments of this disclosure are described: mirroring projection (mirroring technology) and online projection.

1. Mirroring projection: A mobile device (for example, a smartphone or a tablet computer) establishes a communication connection to an electronic device (for example, a smart television or a smart screen). The mobile device obtains multimedia content from a network side or a local side, encodes the multimedia content, and then transmits encoded multimedia content to the electronic device in a wireless transmission mode such as a point-to-point transmission mode. The electronic device outputs (for example, displays or plays) the multimedia content after decoding.

The multimedia content may be network multimedia content, local multimedia content, or a combination thereof. The point-to-point transmission mode between the mobile device and the electronic device may include but is not limited to: a wireless fidelity direct (wireless fidelity direct, Wi-Fi direct) connection (which is also referred to as a wireless fidelity peer-to-peer (wireless fidelity peer-to-peer, Wi-Fi P2P) communication connection), a Bluetooth communication connection, a near field communication (near field communication, NFC) connection, and the like.

Mirroring projection may include miracast formulated by the Wi-Fi Alliance, and private mirroring projection solutions formulated by various companies, for example, cast+ developed by Huawei and AirPlay developed by Apple. Miracast is based on basic technical standards developed by the wireless fidelity Wi-Fi Alliance and the real time streaming protocol (real time streaming protocol, RTSP). The Wi-Fi basic technical standards may include wireless transmission technologies 802.11n, 802.11ac, Wi-Fi direct/Wi-Fi P2P. and tunneled direct link setup (tunneled direct link setup, TDLS), WPA2 (Wi-Fi protected access 2) encryption for security management, a WMM (Wi-Fi multimedia) technology for providing quality of service and traffic management, and the like.

The following further describes mirroring projection with reference to FIG. 1A. FIG. 1A shows an example of a scenario in which a mobile device shares a network video with an electronic device based on mirroring projection. As shown in FIG. 1A, the mobile device establishes a communication connection (for example, a Wi-Fi P2P connection) to the electronic device. In addition, the mobile device accesses a routing device, and obtains streaming media from a server through the routing device. That the mobile device accesses the routing device may be specifically as follows: The mobile device accesses an access point (access point, AP) provided by the routing device. Then, in a process in which the mobile device plays the streaming media, the mobile device obtains screen-recorded content and recorded content in a manner such as screen recording and recording, separately encodes the screen-recorded content and the recorded content in real time, and then sends encoded screen-recorded content and encoded recorded content to the electronic device through, for example, the Wi-Fi P2P connection. After receiving the encoded screen-recorded content and the encoded recorded content, the electronic device plays and displays the encoded screen-recorded content and the encoded recorded content in real time.

It can be learned from FIG. 1A that, when the network video is shared based on mirroring projection, the network video received by the electronic device undergoes a plurality of times of network transmission and encoding and decoding conversion. As a result, a process is complex. In addition, image quality (for example, resolution) of the network video played by the electronic device is limited by the mobile device, and a playing effect may be poor. This affects user experience. However, an audio-visual synchronization effect of mirroring projection is good.

In some implementations, mirroring projection may also be referred to as full sharing projection, wireless display, or the like.

2. Online projection: Both a mobile device and an electronic device access the internet or a local area network. The mobile device sends only a website address corresponding to a multimedia resource to be projected, for example, a uniform resource locator (uniform resource locator, URL), to the electronic device. The electronic device obtains corresponding multimedia content from the internet side or the local area network side based on the website address, to output (for example, play or display) the multimedia content.

The multimedia content may be network multimedia content, local multimedia content, or a combination thereof. Herein, the electronic device and the mobile device may access a local area network constructed by a same wireless Wi-Fi access point AR or may be connected to different networks, for example, access different local area networks constructed by different APs. The different local area networks are interconnected through the internet.

Online projection may include DLNA, and private online projection solutions formulated by various companies, for example, Google cast developed by Google and AirPlay developed by Apple. The DLNA is based on the universal plug and play (universal plug and play, UPnP) protocol.

The following further describes online projection with reference to FIG. 1B. FIG. 1B shows an example of a scenario in which a mobile device shares a network video with an electronic device based on online projection. As shown in FIG. 1B, both the mobile device and the electronic device access a local area network constructed by a Wi-Fi AP, the mobile device sends a website address of a to-be-played network video to the electronic device through the AP, and then the electronic device obtains multimedia content based on the website address. The website address is an address of a server that provides a network audio and video service. When the network video is shared based on online projection, the electronic device may directly obtain the multimedia content from the network side, without a need to perform network transmission and encoding and decoding conversion on the network video for a plurality of times. In this way, a process is simple, and a good playing effect may be produced when the electronic device plays the network video, so that user experience is good. However, in comparison with mirroring projection, audio-visual synchronization of online projection is poorer.

In some implementations, online projection may also be referred to as network projection or the like.

In embodiments of this disclosure, the mirroring projection mode may be referred to as a first wireless projection mode, and the online projection mode may be referred to as a second wireless projection mode.

FIG. 2 is a schematic diagram of a scenario of a wireless projection method according to an embodiment of this disclosure. As shown in FIG. 2, a mobile device 100 may project multimedia content onto an electronic device 200 through mirroring projection, or may project multimedia content onto an electronic device 200 through online projection.

When the mobile device 100 projects the multimedia content onto the electronic device 200 through mirroring projection, the mobile device 100 and the electronic device 200 may establish a Wi-Fi P2P connection, or may establish another short-distance communication direct connection, for example, Bluetooth or ZigBee. In mirroring projection, the multimedia content projected by the mobile device 100 may be from the mobile device 100, or may be from a server 400. In this case, the mobile device 100 is connected to the server 400 through a Wi-Fi access point 300.

When the mobile device 100 projects the multimedia content onto the electronic device 200 through online projection, both the mobile device 100 and the electronic device 200 may access the Wi-Fi access point 300, and therefore are in a same local area network. In some other embodiments, the mobile device 100 and the electronic device 200 may alternatively access different networks. This is not limited in embodiments of this disclosure. It should be emphasized that, unless otherwise specified, in the following embodiments of this disclosure, both the mobile device 100 and the electronic device 200 access the same local area network through the Wi-Fi access point 300. In online projection, the multimedia content projected by the mobile device 100 is from the server 400.

The server 400 provides a network audio and video service. For example, the server 400 may be a server that stores various multimedia content. For example, the server 400 may be a Tencent Video server that provides an audio and video service. There may be one or more servers 400.

In some embodiments, in a process in which the mobile device 100 shares a network video with the electronic device 200 through mirroring projection, the mobile device 100 may automatically or with a trigger of a user, switch mirroring projection to online projection, and continue to share the network video with the electronic device 200 through online projection. For example, the network video may be obtained from the server 400 when the mobile device 100 runs a video application (application, APP) program.

In some embodiments, after the mobile device 100 switches mirroring projection to online projection, the mobile device 100 may further switch online projection back to mirroring projection in some cases.

The mobile device in embodiments of this disclosure includes, but is not limited to, a smartphone, a tablet computer, a personal digital assistant (personal digital assistant, PDA), a wearable electronic device (for example, a smartwatch or smart glasses) having a wireless communication function, and the like. An example embodiment of the mobile device includes, but is not limited to, a portable electronic device equipped with iOS®, Android®, Harmony®, Windows, Linux, or another operating system. The mobile device may alternatively be another portable electronic device such as a laptop (Laptop). It should be further understood that, in some other embodiments, the mobile device may not be a portable electronic device but a desktop computer.

For example, FIG. 3A shows a hardware structure of the mobile device 100 according to an embodiment of this disclosure. As shown in FIG. 3A, the mobile device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the mobile device 100. In some other embodiments of this disclosure, the mobile device 100 may include more or fewer components than those shown in the figure, or some components may be combined, or some components may be split, or a different component arrangement may be used. The components shown in the figure may be implemented by hardware, software, or a combination of software and hardware.

The processor 110 may include one or more processing units. For example, the processor 110 may include an application processor (application processor. AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

A wireless communication function of the mobile device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile device 100 may be configured to cover one or more communication frequency bands. Different antennas may alternatively be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the mobile device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least a part of functional modules in the mobile communication module 150 may be disposed in the processor 110. In some embodiments, at least a part of functional modules of the mobile communication module 150 may be disposed in a same component as at least a part of modules of the processor 110.

The wireless communication module 160 may provide a wireless communication solution that is applied to the mobile device 100, and that includes a wireless local area network (wireless local area network. WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), NFC, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the mobile device 100, the antenna 1 and the mobile communication module 150 are coupled, and the antenna 2 and the wireless communication module 160 are coupled, so that the mobile device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system. GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system, SBAS).

The wireless communication module 160 may be configured to establish a communication connection (for example, a Wi-Fi direct communication connection or a Bluetooth communication connection) to the electronic device 200, and send, to the electronic device 200 through the communication connection, data that is collected by the mobile device 100 through screen recording and recording and that is encoded. In other words, the wireless communication module 160 may support sharing of multimedia content between the mobile device 100 and the electronic device 200 based on mirroring projection (for example, miracast).

The wireless communication module 160 may alternatively access the local area network constructed by the Wi-Fi access point 300 or another network, and may send a website address of currently played multimedia content to the electronic device 200 through the network. Then, the electronic device 200 may directly obtain the multimedia content by using the website address. In other words, the wireless communication module 160 may support sharing of multimedia content between the mobile device 100 and the electronic device 200 based on online projection (for example, DLNA).

In some embodiments of this disclosure, the processor 110 is configured to: when the mobile device 100 shares multimedia content with the electronic device 200 based on mirroring projection, identify a current scenario, and notify the electronic device 200 of the scenario by using the wireless communication module 160, so that the electronic device 200 adaptively selects a corresponding playing policy based on the scenario to play the multimedia content. For a manner in which the processor 110 identifies the current scenario and a manner in which the wireless communication module 160 notifies the electronic device 200 of the current scenario, refer to related descriptions in subsequent method embodiments. Details are not described herein.

In some other embodiments of this disclosure, the processor 110 is further configured to: in a process in which the mobile device 100 shares a network video with the electronic device 200 based on mirroring projection, automatically or with a trigger of a user, indicate the wireless communication module 160 to switch mirroring projection to online projection. For specific implementation of switching, by the wireless communication module 160, mirroring projection to online projection, refer to a related description in subsequent method embodiments. Details are not described herein.

In some embodiments, after the wireless communication module 160 switches mirroring projection to online projection, the processor 110 may be further configured to indicate the wireless communication module 160 to switch online projection back to mirroring projection in some cases. For a case in which the wireless communication module 160 switches online projection back to mirroring projection, refer to a related description in subsequent method embodiments.

The mobile device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the mobile device 100 may include one or N displays 194, where N is a positive integer greater than 1.

In embodiments of this disclosure, the display 194 is configured to display a user interface that is implemented on the mobile device 100 and that is mentioned in embodiments of this disclosure. For specific implementation of the user interface, refer to a related description in subsequent method embodiments.

The video codec is configured to compress or decompress a digital video. The mobile device 100 may support one or more video codecs. In this way, the mobile device 100 can play or record videos in a plurality of coding formats, for example, moving picture experts group (moving picture experts group, MPEG)-1, MPEG-2, MPEG-3, and MPEG-4.

The mobile device 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or a part of functional modules in the audio module 170 are disposed in the processor 110.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided on the display 194. In some other embodiments, the touch sensor 180K may alternatively be disposed on a surface of the mobile device 100 at a location different from that of the display 194.

Figure 3B:
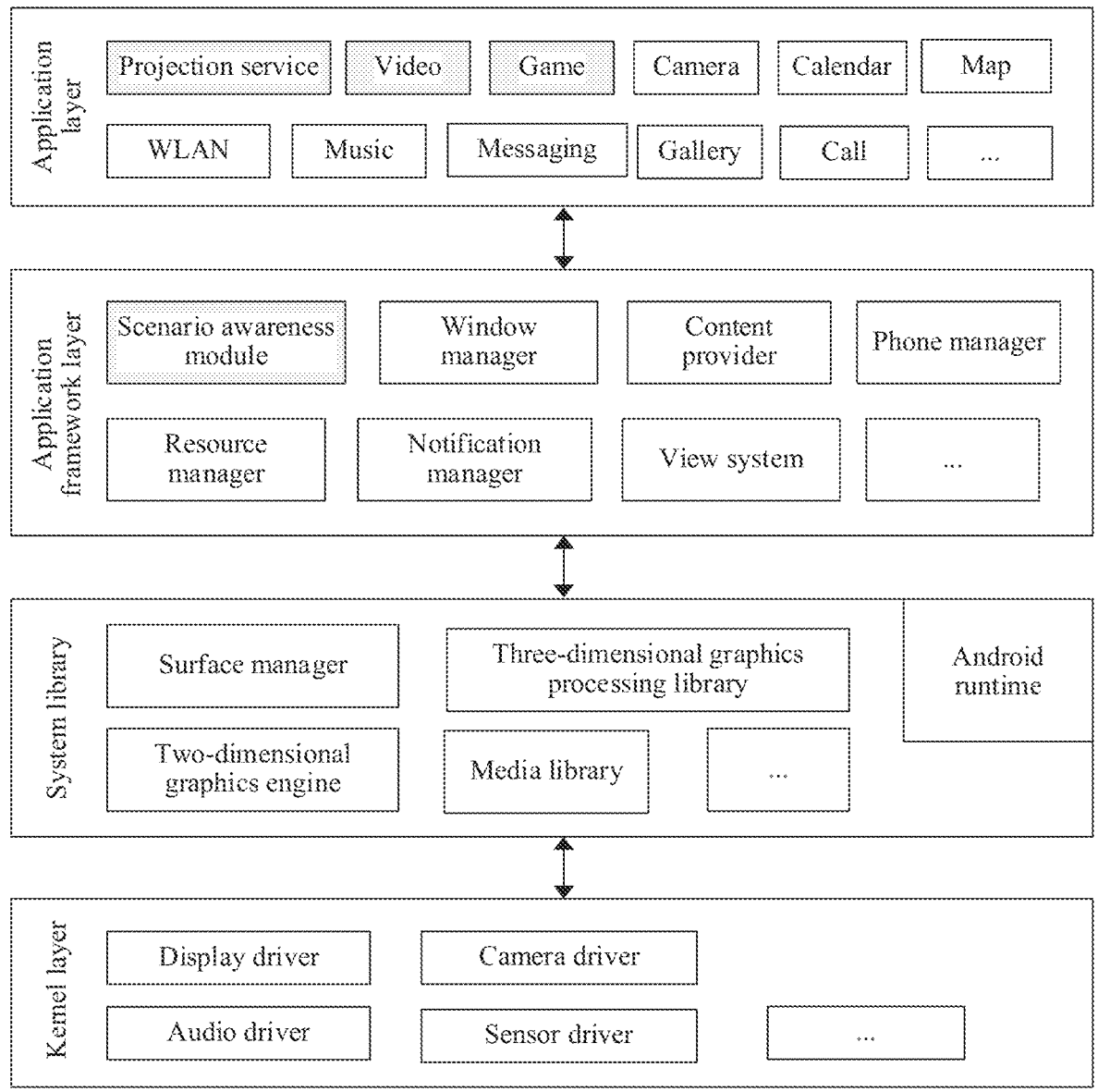
FIG. 3B is a schematic diagram of a software structure of a mobile device according to an embodiment of this disclosure.

A software system of the mobile device 100 may use a layered architecture, an event-driven architecture, a microkernel architecture, a microservice architecture, or a cloud architecture. In embodiments of this disclosure, an Android system with the layered architecture is used as an example to describe a software structure of the mobile device 100. FIG. 3B is a schematic block diagram of a software structure of the mobile device 100 according to an embodiment of this disclosure. In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library layer, and a kernel layer from top to bottom. The application layer may include a series of application packages.

As shown in FIG. 3B, the application packages may include applications such as a projection service, a video application, a game application, an office application, Camera, Gallery, Calendar, Call, Map, Navigation, WLAN, Bluetooth, Music, and Messaging. For ease of description, the video application is referred to as a video application for short, and the game application is referred to as a game application for short.

The projection service provides a mirroring projection function for the mobile device 100. The projection service supports the mobile device 100 in sharing multimedia content with the electronic device 200 based on mirroring projection. The projection service may invoke the wireless communication module 160 of the mobile device 100 to provide the mirroring projection function.

The video application may be referred to as the video application, and is used for providing an audio and video service for the mobile device 100. The mobile device 100 may run the video application, and obtain a network video from a server corresponding to the video application. There may be one or more video applications. For example, the video application may include Tencent Video.

The video application may provide an online projection function. The video application supports the mobile device 100 in sharing multimedia content with the electronic device 200 through online projection. Specifically, when the mobile device 100 runs the video application and plays the network video in the video application, if the user enables the online projection function of the video application, the mobile device 100 may send a website address of the network video to the electronic device 200.

The game application may be referred to as the game application, and is used for providing a game service for the mobile device 100. The mobile device 100 may run the game application, and obtain a game resource locally or from a server corresponding to the game application. There may be one or more game applications.

The application framework layer provides an application programming interface (application programming interface, API) and a programming framework for an application at the application layer. The application framework layer includes some predefined functions.

As shown in FIG. 3B, the application framework layer may include a scenario awareness module, a window manager, a content provider, a view system, a phone manager, a resource manager, a notification manager, and the like.

Specifically, the scenario awareness module is configured to sense an operation of a currently used application, and identify, based on the operation, the application currently used by the mobile device 100, to determine a scenario in which the mobile device 100 is located. The scenario awareness module is optional. In some embodiments, a function of the scenario awareness module may be integrated into the projection service at the application layer.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and answered, a browsing history and bookmarks, an address book, and the like.

The view system includes visual controls such as a control for displaying text and a control for displaying an image. The view system may be configured to construct an application. A display interface may include one or more views. For example, a display interface including a message notification icon may include a view for displaying text and a view for displaying an image.

The Android runtime includes a kernel library and a virtual machine. The Android runtime is responsible for scheduling and management of the Android system.

The kernel library includes two parts: One part is a function that needs to be invoked by a Java language, and the other part is a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording in a plurality of commonly used audio and video formats, and static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be emphasized that FIG. 3B shows merely an example. The software structure of the mobile device 100 provided in this embodiment of this disclosure may alternatively use another software architecture, for example, a software architecture of iOS®, Harmony®, Windows®, Linux, or another operating system.

The electronic device in embodiments of this disclosure includes, but is not limited to, a tablet computer, a desktop computer, a portable electronic device (for example, a laptop, Laptop), a smart television (for example, a smart screen), a vehicle-mounted computer, a smart speaker, an augmented reality (augmented reality, AR) device, a virtual reality (virtual reality, VR) device, an electronic billboard having a display, a projector used independently (for example, projected on a wall) or used in combination with a display apparatus (for example, a screen), another intelligent device having a display, another intelligent device having a speaker, and the like. An example embodiment of the electronic device includes, but is not limited to, a portable electronic device equipped with iOS®, Android®, Harmony®, Windows, Linux, or another operating system. In some embodiments, the electronic device 200 may be a television installed with a television box. The television box is configured to receive multimedia content from the mobile device 100 or the server 400, and provide a projection function. The television provides only a display function. In some embodiments, the electronic device 200 may be further used in cooperation with a remote control. The remote control and the electronic device 200 may communicate with each other by using an infrared signal.

Figure 4:
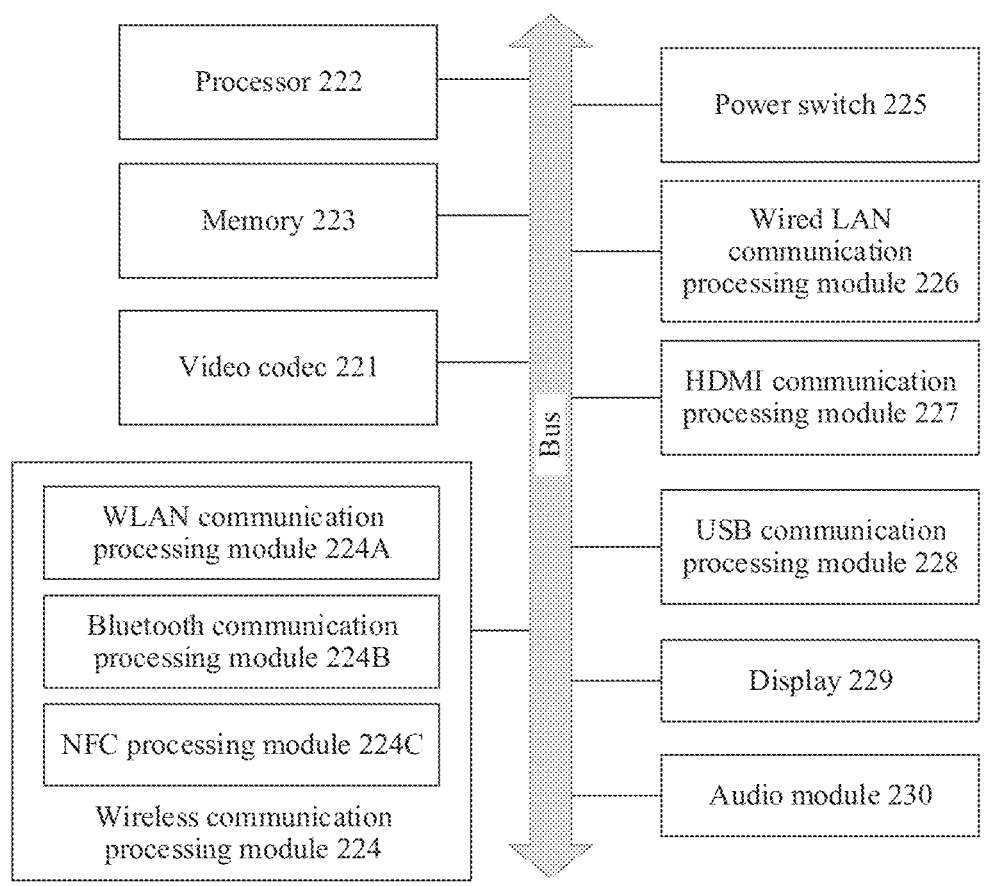
FIG. 4 is a schematic diagram of a hardware structure of an electronic device according to an embodiment of this disclosure.

For example. FIG. 4 shows a hardware structure of the electronic device 200 according to an embodiment of this disclosure. As shown in FIG. 4, the electronic device 200 may include a video codec 221, a processor 222, a memory 223, a wireless communication processing module 224, a power switch 225, a wired LAN communication processing module 226, a high definition multimedia interface (high definition multimedia interface, HDMI) communication processing module 227, a USB communication processing module 228, a display 229, and an audio module 230. The modules may be connected through a bus. The processor 222 may be configured to read and execute computer-readable instructions.

In specific implementation, the processor 222 may mainly include a controller, an arithmetic unit, and a register. The controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving register operation data, intermediate operation results, and the like that are temporarily stored during instruction execution. In specific implementation, a hardware architecture of the processor 222 may be an application-specific integrated circuit (ASIC) architecture, an MIPS architecture, an ARM architecture, an NP architecture, or the like.

The wireless communication processing module 224 may include a WLAN communication processing module 224A, and may further include a Bluetooth (BT) communication processing module 224B, an NFC processing module 224C, a cellular mobile communication processing module (not shown in the figure), and the like.

In some embodiments, the wireless communication processing module 224 may be configured to establish a communication connection to the mobile device 100, and receive, through the communication connection, encoded data sent by the mobile device 100. For example, the WLAN communication processing module 224A may be configured to establish a Wi-Fi direct communication connection to the mobile device 100, the Bluetooth (BT) communication processing module 224B may be configured to establish a Bluetooth communication connection to the mobile device 100, and the NFC processing module 224C may be configured to establish an NFC connection to the mobile device 100. In other words, the wireless communication processing module 224 may support sharing of multimedia content between the mobile device 100 and the electronic device 200 through mirroring projection (for example, miracast).

In an implementation, the wireless communication processing module 224 may listen to a signal, for example, a probe request or a scanning signal, transmitted by the mobile device 100, discover the mobile device 100, and establish a communication connection to the mobile device 100. In another implementation, the wireless communication processing module 224 may alternatively transmit a signal, for example, a probe request or a scanning signal, so that the electronic device 200 can discover the mobile device 100 and establish a communication connection (for example, a Wi-Fi P2P connection) to the mobile device 100.

In some embodiments, when the multimedia content is shared between the mobile device 100 and the electronic device 200 through mirroring projection (for example, miracast), the wireless communication processing module 224 (for example, the WLAN communication processing module 224A) may further receive a scenario notified by the mobile device 100. The processor 222 may parse and learn the scenario, adaptively select a playing policy corresponding to the scenario, and invoke, according to the playing policy, modules such as the display 229 and the audio module 230 to play the multimedia content sent by the mobile device 100.

In some embodiments, the wireless communication processing module 224 (for example, the WLAN communication processing module 224A) may alternatively access the local area network constructed by the Wi-Fi access point 300 or another network; receive, through the Wi-Fi access point 300, a website address of a network video sent by the mobile device 100; and then directly obtain the network video from a server corresponding to the website address. In other words, the WLAN communication processing module 224A may support sharing of the network video between the mobile device 100 and the electronic device 200 through online projection (for example, DLNA).

The video codec 221 is configured to compress or decompress a digital video. In this embodiment of this disclosure, the video codec 221 may decompress the multimedia content from the mobile device 100 or the server 400. The electronic device 200 may support one or more video codecs, and may play a video in one or more coding formats, for example, MPEG-1, MPEG-2, MPEG-3, and MPEG-4.

The processor 222 may be configured to parse a signal received by the wireless communication processing module 224, for example, a probe request broadcast by the electronic device 200. The processor 222 may be configured to perform a corresponding processing operation based on a parsing result, for example, generate a probe response. The processor 222 may be configured to drive the display 229 to perform displaying based on a decompression result of the video codec 221.

The memory 223 is coupled to the processor 222, and is configured to store various software programs and/or a plurality of sets of instructions. In specific implementation, the memory 223 may include a high-speed random access memory, and may also include a non-volatile memory, for example, one or more magnetic disk storage devices, a flash memory device, or another non-volatile solid-state storage device. The memory 223 may store an operating system, for example, an embedded operating system such as uCOS, VxWorks, RTLinux, Harmony, or Android. The memory 223 may further store a communication program. The communication program may be used for communicating with the electronic device 200, one or more servers, or an additional device.

The power switch 225 may be configured to control a power supply to supply power to the electronic device 200.

The wired LAN communication processing module 226 may be configured to communicate with another device in a same LAN through a wired LAN; or may be configured to connect to a WAN through a wired LAN, and may communicate with a device in the WAN.

The HDMI communication processing module 227 may be configured to communicate with another device through an HDMI interface (not shown in the figure).

The USB communication processing module 228 may be configured to communicate with another device through a USB interface (not shown in the figure).

The display 229 may be configured to display an image, a video, and the like. The display 229 may be a display such as an LCD, an OLED, an AMOLED, an FLED, or a QLED. For content displayed on the display 229, refer to a related description in subsequent method embodiments.

The audio module 230 may be configured to output an audio signal through an audio output interface, so that the electronic device 200 can support audio playing. The audio module 230 may be further configured to receive audio data through an audio input interface. The audio module 230 may include but is not limited to a microphone, a speaker, a receiver, and the like.

In some embodiments, the electronic device 200 may further include a serial interface such as an RS-232 interface. The serial interface may be connected to another device, for example, an audio speaker device such as a speaker, so that the display collaborates with the audio speaker device to play audio and a video.

It may be understood that the structure shown in FIG. 4 does not constitute a specific limitation on the electronic device 200. In some other embodiments of this disclosure, the electronic device 200 may include more or fewer components than those shown in the figure, or some components may be combined, or some components may be split, or a different component arrangement may be used. The components shown in the figure may be implemented by hardware, software, or a combination of software and hardware.

A software system of the electronic device 200 may use a layered architecture, an event-driven architecture, a microkernel architecture, a microservice architecture, a cloud architecture, or the like. For example, the software system of the electronic device 200 includes, but is not limited to, iOS®, Android®, Harmony®, Windows®, Linux, or another operating system. Harmony® is Huawei's HarmonyOS.

An application layer of the software system of the electronic device 200 may include a projection service and a projection player. The projection service supports the electronic device 200 in receiving, through mirroring projection or online projection, multimedia content projected by the mobile device 100. Specifically, the projection service may invoke the wireless communication processing module 224 to provide a mirroring projection function and an online projection function. The projection player is configured to play the multimedia content from the mobile device 100 or the server 400.

In some embodiments, when the multimedia content is shared between the electronic device 200 and the mobile device 100 through mirroring projection, the projection service may indicate, based on a current scenario of the mobile device 100, the projection player to play the multimedia content according to a corresponding playing policy.

The following describes in detail a wireless projection method provided in embodiments of this disclosure. In embodiments of this disclosure, video applications may be classified into a customized video application and a non-customized video application based on whether there is a customized online projection mode. The customized video application is an application that has a projection initiation capability. For example, the customized video application is integrated with a software development kit (software development kit, SDK), for example, Tencent Video. A projection status of the mobile device 100 may include: whether the mobile device 100 currently shares multimedia content with the electronic device 200 through mirroring projection. The non-customized video application is an application that does not have a projection capability. For example, the non-customized video application is not integrated with an SDK, and is a video application that is not configured with the SDK that can query a current projection status of a current device.

It has been described above that, after long-term research, it is founded that different applications focus on different requirements. For example, a game application focuses on real-time performance, and has a high requirement on a low latency, but has a low requirement on audio-visual synchronization; and a video application focuses on audio-visual synchronization, but has a low requirement on real-time performance, that is, has a low requirement on a low latency. Therefore, according to the wireless projection method provided in embodiments of this disclosure, a type of an application that is currently being run in the foreground can be automatically identified, and a user is prompted to select a recommended wireless projection mode, or a wireless projection mode is automatically changed to a suitable wireless projection mode.

Figure 5A:
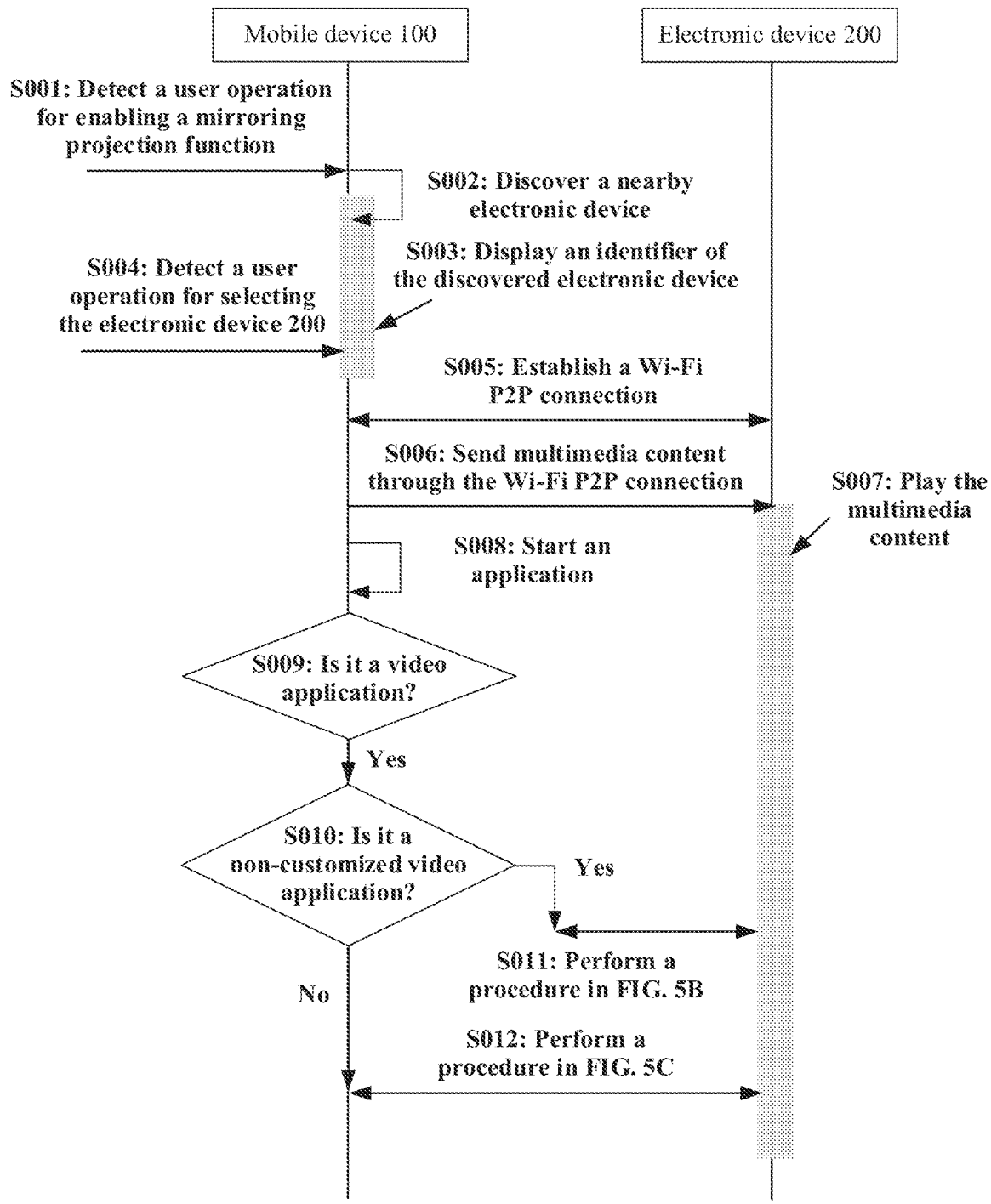
FIG. 5A to FIG. 5C are schematic flowcharts of a wireless projection method according to an embodiment of this disclosure.

FIG. 5A is a schematic flowchart of a wireless projection method according to an embodiment of this disclosure. As shown in FIG. 5A, the method may include the following steps.

S001 to S007: A mobile device 100 shares multimedia content with an electronic device 200 through mirroring projection.

S001: The mobile device 100 detects a user operation for enabling a mirroring projection function.

Figure 6A:
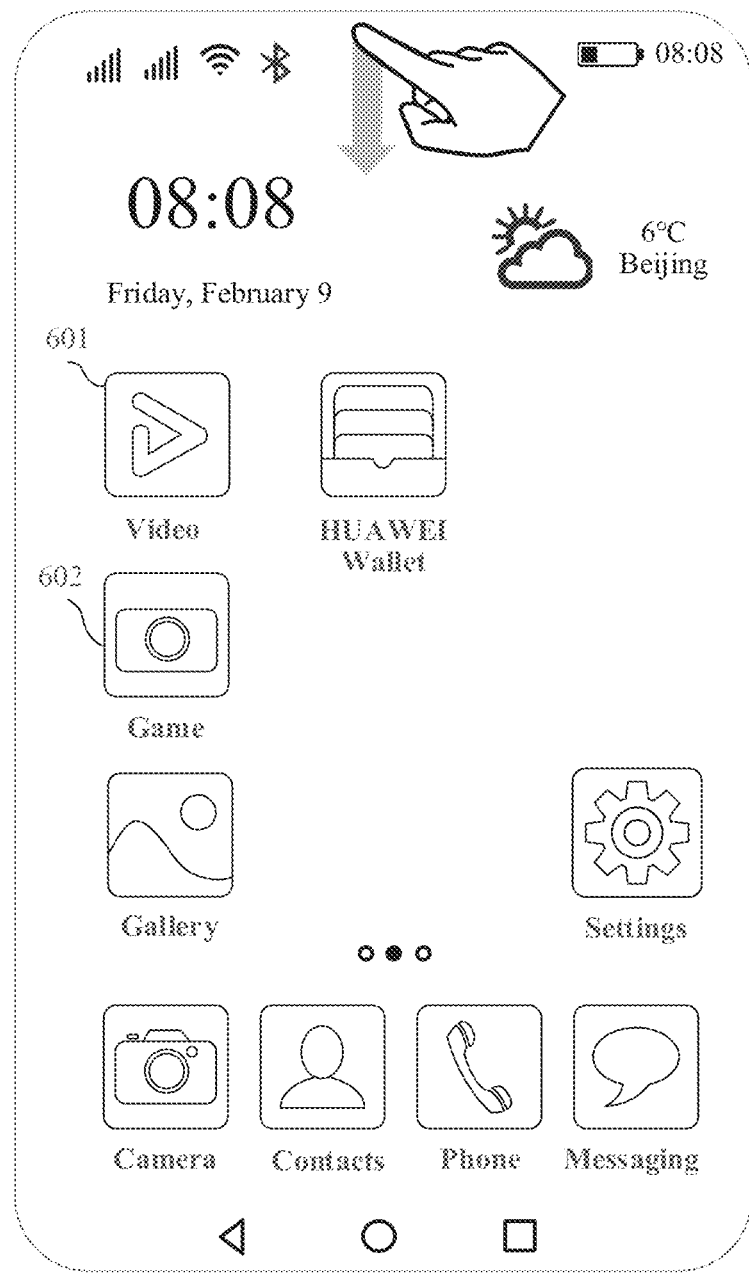
FIG. 6A to FIG. 6C, FIG. 7A to FIG. 7C, and FIG. 8A to FIG. 8H are schematic diagrams of user interfaces of a mobile device in a wireless projection method according to an embodiment of this disclosure.
Figure 6B:
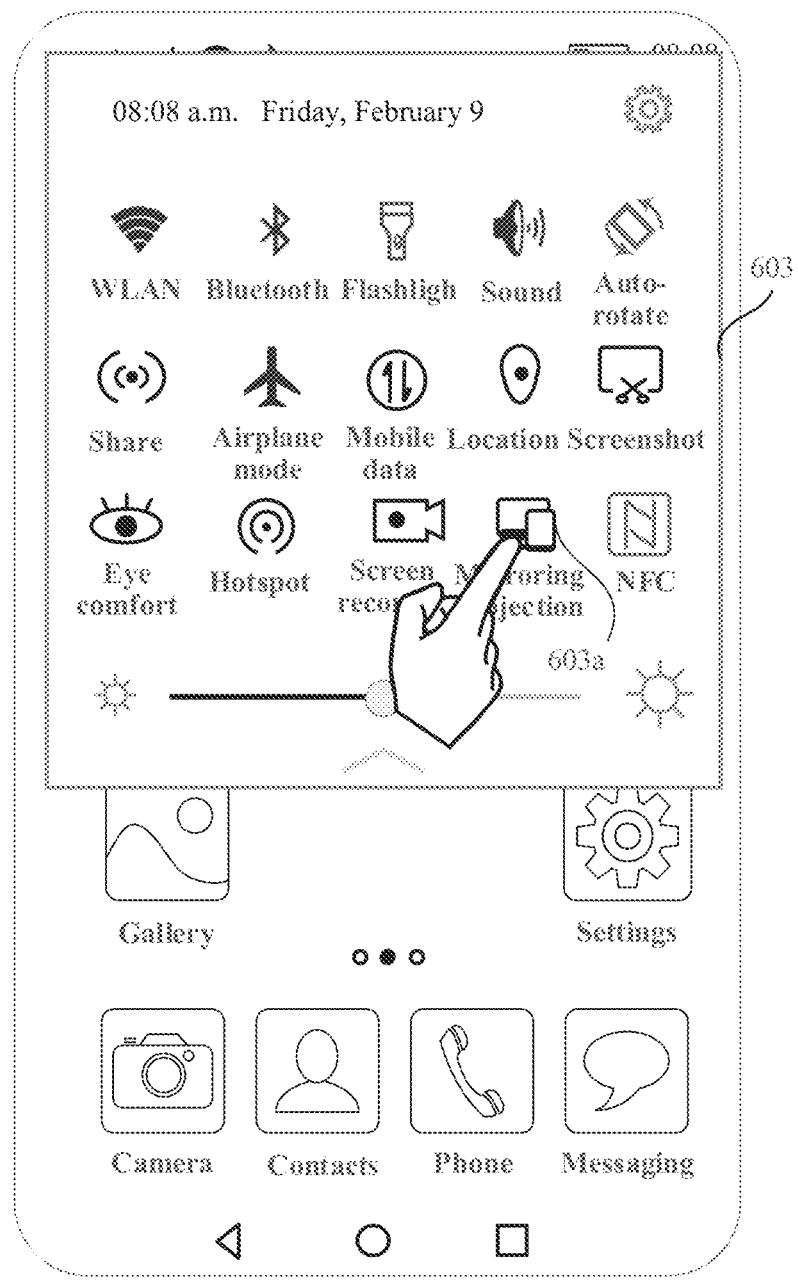

FIG. 6A and FIG. 6B show examples of the user operation that is for enabling the mirroring projection function and that is detected by the mobile device 100. FIG. 6A shows an example of a user interface 61 that is on the mobile device 100 and that is used for displaying an installed application. The user interface 61 displays a status bar, a calendar indicator, a weather indicator, a tray having a frequently used application icon, a navigation bar, an icon 601 of a video application, an icon 602 of a game application, an icon of another application, and the like. The status bar may include one or more signal strength indicators of a mobile communication signal (which may also be referred to as a cellular signal), an operator's name (for example, "China Mobile"), one or more signal strength indicators of a Wi-Fi signal, a battery status indicator, a time indicator, and the like. The navigation bar may include system navigation buttons such as a back button, a home screen button, and a multitask button. In some embodiments, the user interface 61 shown in FIG. 6A as an example may be a home screen (Home screen).

As shown in FIG. 6A and FIG. 6B, when the mobile device 100 detects a downward-sliding gesture on a display, the mobile device 100 displays a window 603 in the user interface 61 in response to the sliding gesture. As shown in FIG. 6B, a control 603a may be displayed in the window 603. The control 603a may receive an operation (for example, a touch operation or a tap operation) for enabling/disabling the mirroring projection function of the mobile device 100. A representation form of the control 603a may include an icon and/or text (for example, text "mirroring projection", "wireless projection", or "multi-screen interaction"). The window 603 may further display on/off controls having other functions such as Wi-Fi Bluetooth, and a flashlight. As shown in FIG. 6B, the mobile device 100 may detect a user operation performed on the control 603a, that is, detect the user operation for enabling the mirroring projection function. In some embodiments, after detecting the user operation performed on the control 603a, the mobile device 100 may change a display form of the control 603a, for example, add a shadow when the control 603a is displayed.

The home screen shown in FIG. 6A is not limited thereto. A user may alternatively enter a downward-sliding gesture in another interface to trigger the mobile device 100 to display a window.

The user operation that is performed by the user on the control 603a in the window 603 and that is shown in FIG. 6A and FIG. 6B is not limited thereto. In embodiments of this disclosure, the user operation for enabling the mirroring projection function may alternatively be implemented in another form. This is not limited in embodiments of this disclosure.

For example, the mobile device 100 may further display a setting interface provided by a setting (setting) application.

The setting interface may include a control that is provided for the user and that is configured to enable/disable the mirroring projection function of the mobile device 100. The user may enable the mirroring projection function of the mobile device 100 by entering a user operation on the control.

For another example, the user may alternatively move the mobile device 100 close to an NFC tag of the electronic device 200, to trigger the mobile device 100 to enable the mirroring projection function.

S002: The mobile device 100 discovers a nearby electronic device.

When detecting the user operation for enabling the mirroring projection function in S001, the mobile device 100 enables one or more of Wi-Fi direct (not shown in the figure), Bluetooth, or NFC in a wireless communication module 160, and discovers a projectable electronic device near the mobile device 100 by using the one or more of Wi-Fi direct, Bluetooth, or NFC. For example, the mobile device 100 may discover the nearby electronic device 200 and another electronic device through Wi-Fi direct.

S003: The mobile device 100 displays an identifier of the discovered nearby electronic device.

In addition to displaying an identifier of an electronic device that can accept mirroring projection and that is discovered by the mobile device 100, the mobile device 100 may further display other information, for example, an image of the discovered electronic device. This is not limited in embodiments of this disclosure.

Figure 6C:
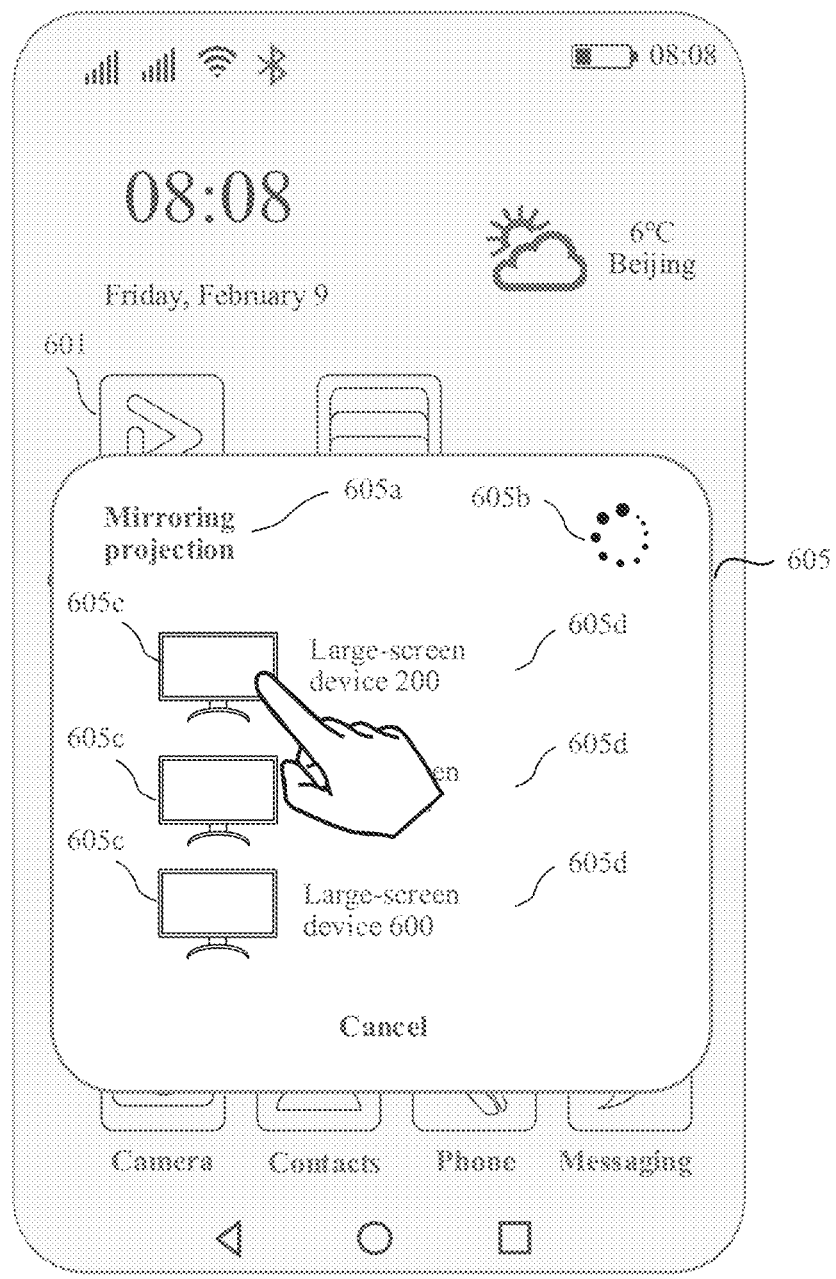

Then, for example, as shown in FIG. 6C, a window 605 pops up on the mobile device. The window 605 includes an interface indicator 605a, an icon 605b, and an image 605c or images 605c and an identifier 605d or identifiers 605d of one or more electronic devices.

A sequence of performing S002 and S003 is not limited in this embodiment of this disclosure. S002 and S003 may be performed simultaneously, or may be performed sequentially. When the mobile device 100 has not found a nearby electronic device, a quantity of electronic devices displayed in the window 605 is 0.

S004: The mobile device 100 detects a user operation for selecting the electronic device 200.

For example, as shown in FIG. 6C, the user operation for selecting the electronic device 200 may be a user operation performed on an image 605c and/or an identifier 605d corresponding to the electronic device 200. The user operation for selecting the electronic device 200 may alternatively be implemented in another form. This is not limited in embodiments of this disclosure.

S005: The mobile device 100 establishes a communication connection to the electronic device 200 in response to the detected user operation for selecting the electronic device 200.

In response to the user operation, the mobile device 100 may establish the communication connection to the electronic device 200 by using one or more wireless communication technologies of Wi-Fi direct, Bluetooth, or NFC. For example, the mobile device 100 establishes a Wi-Fi direct communication connection to the electronic device 200. After establishing the communication connection, the mobile device 100 and the electronic device 200 may perform, through the communication connection, capability negotiation, including a coding format, resolution, an audio format, and the like that are supported by both parties, to facilitate subsequent transmission of multimedia content.

S006: The mobile device 100 sends currently displayed multimedia content to the electronic device 200 through the communication connection between the mobile device 100 and the electronic device 200.

Specifically, the mobile device 100 may obtain the currently displayed multimedia content (including an image and/or audio) through screen recording, recording, and the like, then compress the obtained multimedia content, and send compressed multimedia content to the electronic device 200 through the communication connection between the mobile device 100 and the electronic device 200. For example, the mobile device 100 shares multimedia content with the electronic device 200 based on miracast. The mobile device 100 may obtain, according to stipulations in the miracast protocol in a screen recording manner, an image displayed on the display, and compress the image by using an H.264 coding algorithm; collect audio played by the mobile device 100, and compress the audio by using an advanced audio coding (advanced audio coding, AAC) algorithm; and encapsulate compressed audio data and image data into a transport stream (transport stream, TS), then encode the TS stream according to the real-time transport protocol (real-time transport protocol, RTP), and send encoded data to the electronic device 200 through the Wi-Fi direct connection. That is, the multimedia content is transmitted in a streaming media mode.

S007: The electronic device 200 plays the received multimedia content.

After receiving the multimedia content that is sent by the mobile device 100 through the communication connection, the electronic device 200 may perform decoding processing on the multimedia content, to obtain the multimedia content. For example, the mobile device 100 shares the multimedia content with the electronic device 200 based on miracast. The electronic device 200 may receive an RTP-encoded TS stream through the Wi-Fi direct communication connection between the electronic device 200 and the mobile device 100, perform RTP decoding, TS stream decapsulation, and audio-visual quality processing/latency synchronization processing on the TS stream in sequence, and finally output audio and a video, that is, play the multimedia content. It may be understood that S006 and S007 are continually performed until the mobile device 100 disables the mirroring projection function, enables an online projection function, and the like.

When the electronic device 200 performs S007, the multimedia content played by the electronic device 200 is the same as the multimedia content played by the mobile device 100. When the multimedia content played by the mobile device 100 changes with a user operation, the multimedia content played by the electronic device 200 also changes accordingly.

It may be understood that a process in which the mobile device 100 shares the multimedia content with the electronic device 200 based on mirroring projection shown in S001 to S007 is merely an example. Alternatively, another implementation may be used, and details are not described herein.

S008 to S012: The mobile device 100 prompts, based on a type of a currently started application, the user to select or automatically selects a suitable projection mode.

S008: The mobile device 100 starts an application, or switches an application.

The application started by the mobile device 100 depends on the user, and may be a game application, or may be a video application. The video application may include a customized video application or a non-customized video application.

Figure 7A:
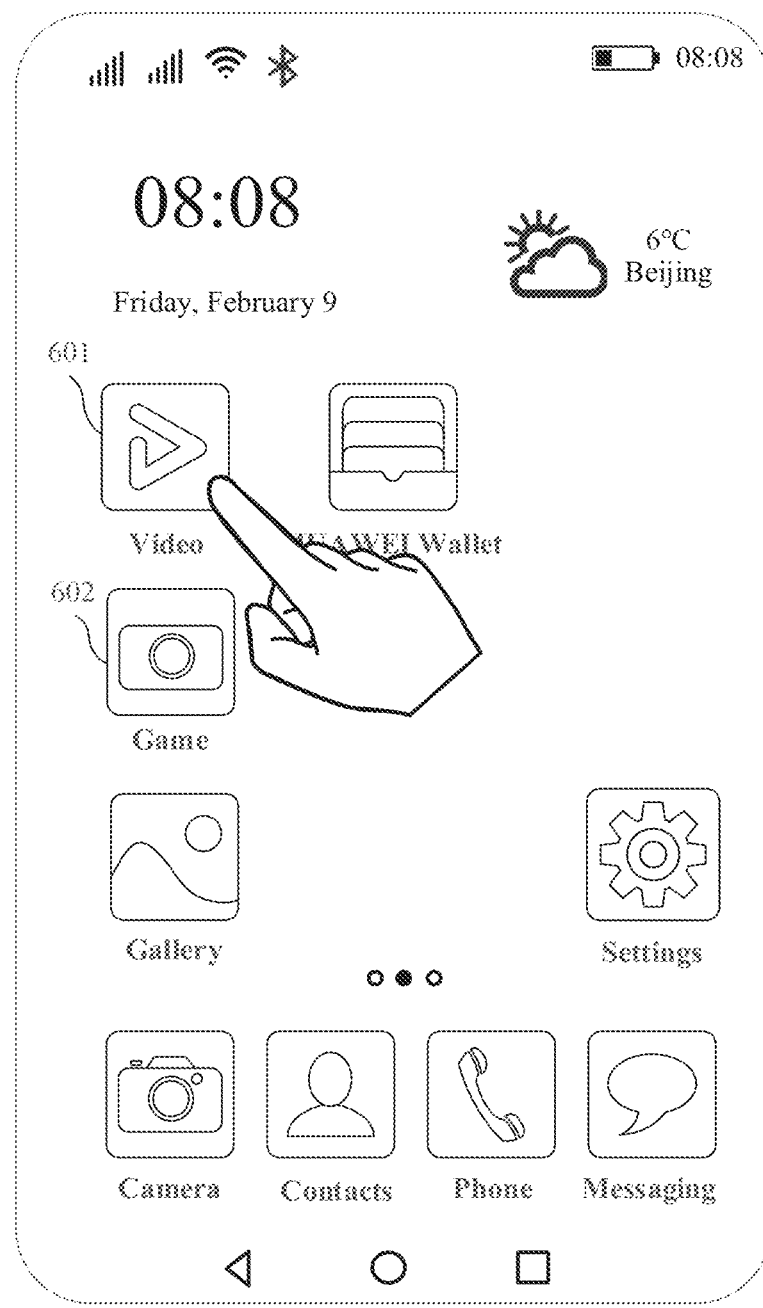
Figure 7B:
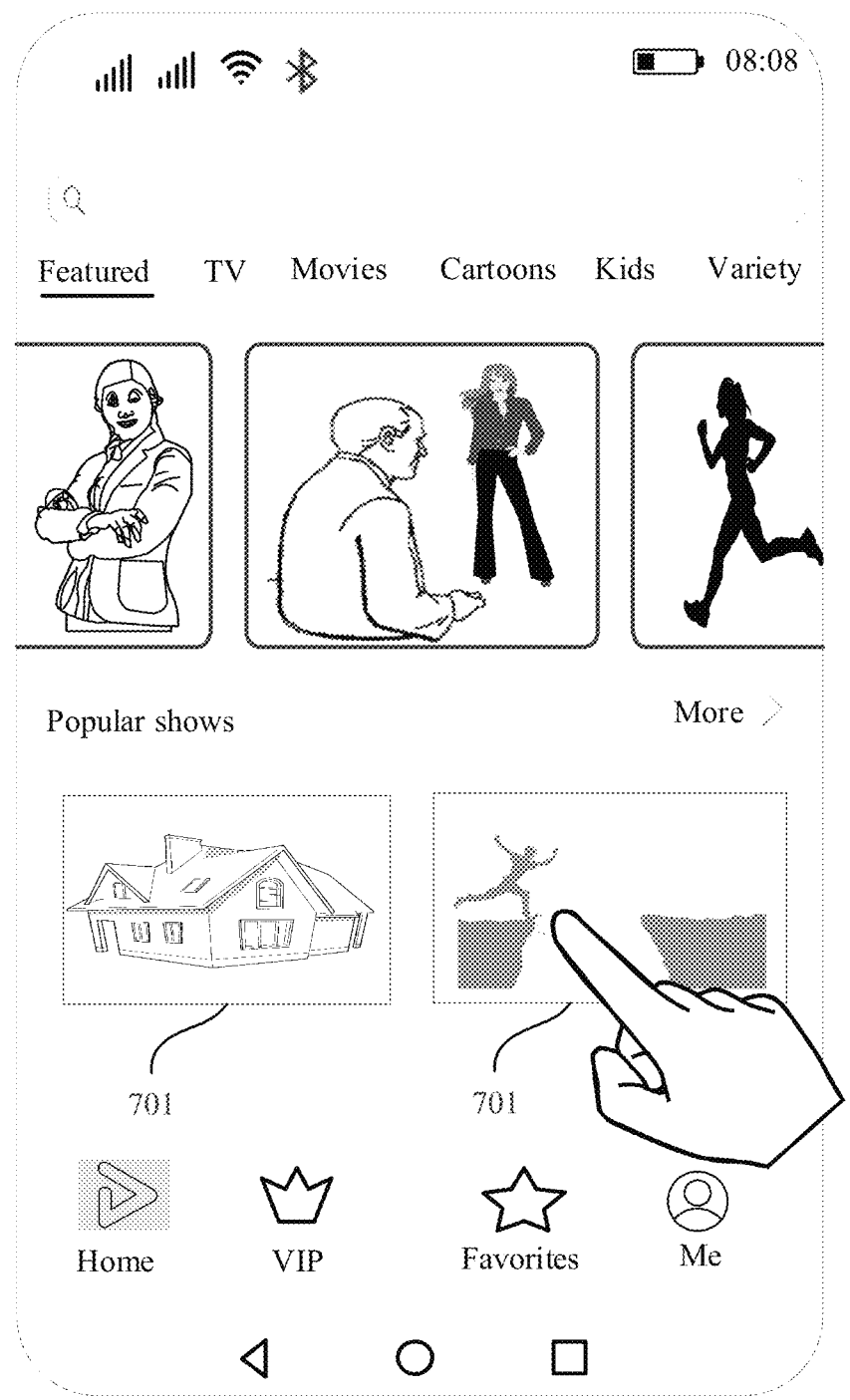

In response to a user operation (for example, a tap operation or a touch operation) detected on an icon of an application in the user interface 61 shown in FIG. 6A, the mobile device 100 may start the application corresponding to the icon, or may start a corresponding application in response to another user operation (for example, a voice instruction). This is not limited herein. For example, as shown in FIG. 7A and FIG. 7B, the mobile device 100 may start the video application in response to the user operation performed on the icon 601 of the video application on the home screen. FIG. 7B shows an example of a user interface 71 displayed after the mobile device 100 starts the video application. The user interface 71 is a home page provided by the video application. As shown in FIG. 7B, the user interface 71 displays one or more video images 701. A video image may be dynamic, or may be static. In addition, the user interface 71 may further display a bottom menu bar, a search box, a subchannel entry, and the like. This is not limited in embodiments of this disclosure. As shown in FIG. 7B, the mobile device 100 may detect a user operation performed on the video image 701; obtain, through a network from a server corresponding to the video application, a network video indicated by the video image 701; and play the network video. The detected network video indicated by the video image 701 operated by the user is a network video selected by the user. An example in which the video application corresponds to a server 400 is used for description in the following embodiment. In other words, a website address of the network video obtained by the mobile device 100 is an address of the server 400.

Figure 7C:
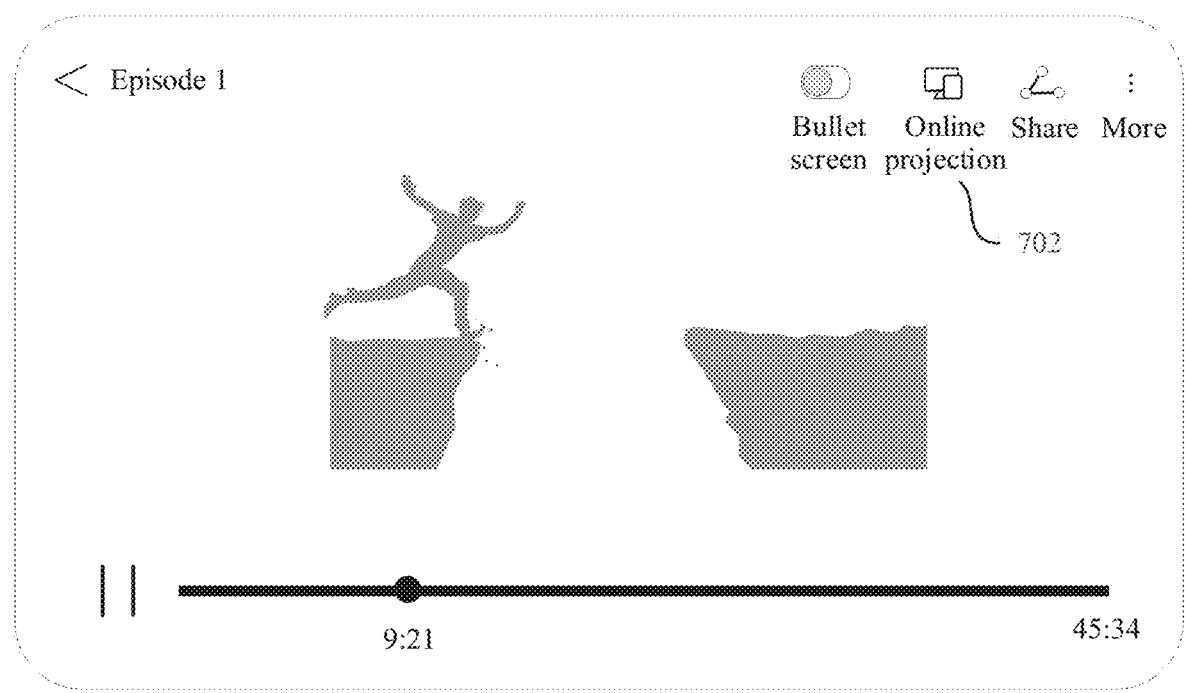

FIG. 7C shows an example of a user interface 72 displayed when the mobile device 100 plays the network video selected by the user. The user interface 72 may be displayed by the mobile device 100 in response to an action of switching the mobile device 100 from a portrait mode to a landscape mode by the user, or displayed when the user taps a full-screen playing control displayed in a lower right corner of the user interface displayed by the mobile device 100. In some embodiments, the user interface 72 may further include an on/off control 702 of online projection. The control 702 is configured to detect a user operation (for example, a tap operation or a touch operation) for enabling/disabling an online projection function of the video application. As shown in FIG. 7C, a display status of the control 702 indicates that the online projection function of the mobile device 100 is currently enabled.

S009. The mobile device 100 determines whether the started application or an application after switching is the video application.

Specifically, the mobile device 100 may monitor an application that is being run in the foreground or an application corresponding to a currently used window, and identify, based on the application, whether the application that is being run in the foreground by the mobile device 100 is the video application. If the application is the video application, S010 is performed.

Specific identification after the application is started or switched may be described with reference to FIG. 10A and FIG. 10B. A scenario awareness module in FIG. 10A and FIG. 10B may sense application startup and application switching by invoking an API by using an operating system. Sensing application switching is used as example. The scenario awareness module sends an "android.ActivityState.CHANGE" message to subscribe to an application switching event. After sensing application switching, the scenario awareness module invokes the API provided by the operating system, to query a top-layer APP name viewed by the user. For example, a task and a package name corresponding to the task are queried by using the API provided by the ActivityManager. The scenario awareness module determines, based on whether the queried application name is in a database or table made in advance, whether the application is the video application. The database or the table may be added, deleted, updated, or the like by the user as required.

S010: The mobile device 100 determines whether the started video application is a non-customized video application.

In some embodiments, the mobile device 100 may store a whitelist. The whitelist may include one or more non-customized video applications. In this way, when the application that is being run in the foreground is in the whitelist, the mobile device 100 may determine that the application that is run in the foreground by the mobile device 100 is a non-customized video application. The non-customized video application in the whitelist may be installed on the mobile device 100, or may not be installed on the mobile device 100. The mobile device 100 may update the whitelist as required.

If the video application is the non-customized video application, S011 is performed; or if the video application is a customized video application, S012 is performed.

S011: Perform a procedure in FIG. 5B.

S012: Perform a procedure in FIG. 5C.

Figure 5B:
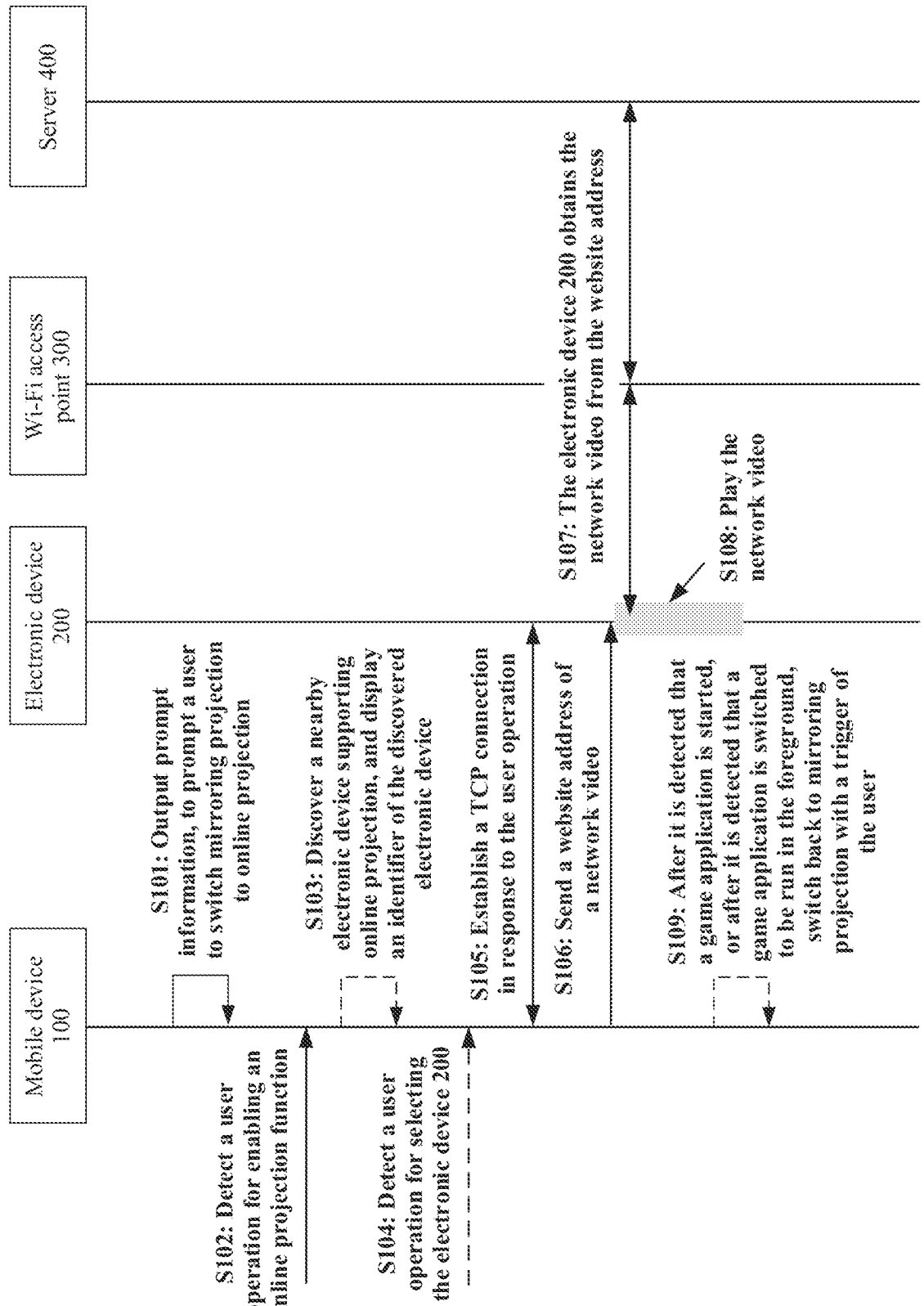

The following describes the procedure in FIG. 5B. FIG. 5B describes a procedure of switching mirroring projection currently used by the mobile device 100 to online projection for the non-customized video application. In FIG. 5B, when the mobile device 100 shares, with the electronic device 200 through mirroring projection, a network video provided by the non-customized video application, the mobile device 100 may switch mirroring projection to online projection with a trigger of the user, and share the network video based on online projection. The procedure shown in FIG. 5B may include the following steps.

S101: The mobile device 100 outputs prompt information, where the prompt information is used for prompting the user to switch mirroring projection to online projection.

In S101, implementation forms of the prompt information may include but are not limited to an interface element displayed by the mobile device 100 on a display, played audio, indicator blinking, a motor vibration, and the like. The mobile device 100 may output the prompt information in the following three scenarios.

Scenario 1: After starting a video application, the mobile device 100 outputs the prompt information.

When the mobile device 100 identifies, in a manner of S009, or S009 and S010, that an application that is run by the mobile device 100 in the foreground is a non-customized video application, the mobile device 100 outputs the prompt information.

Figure 8A:
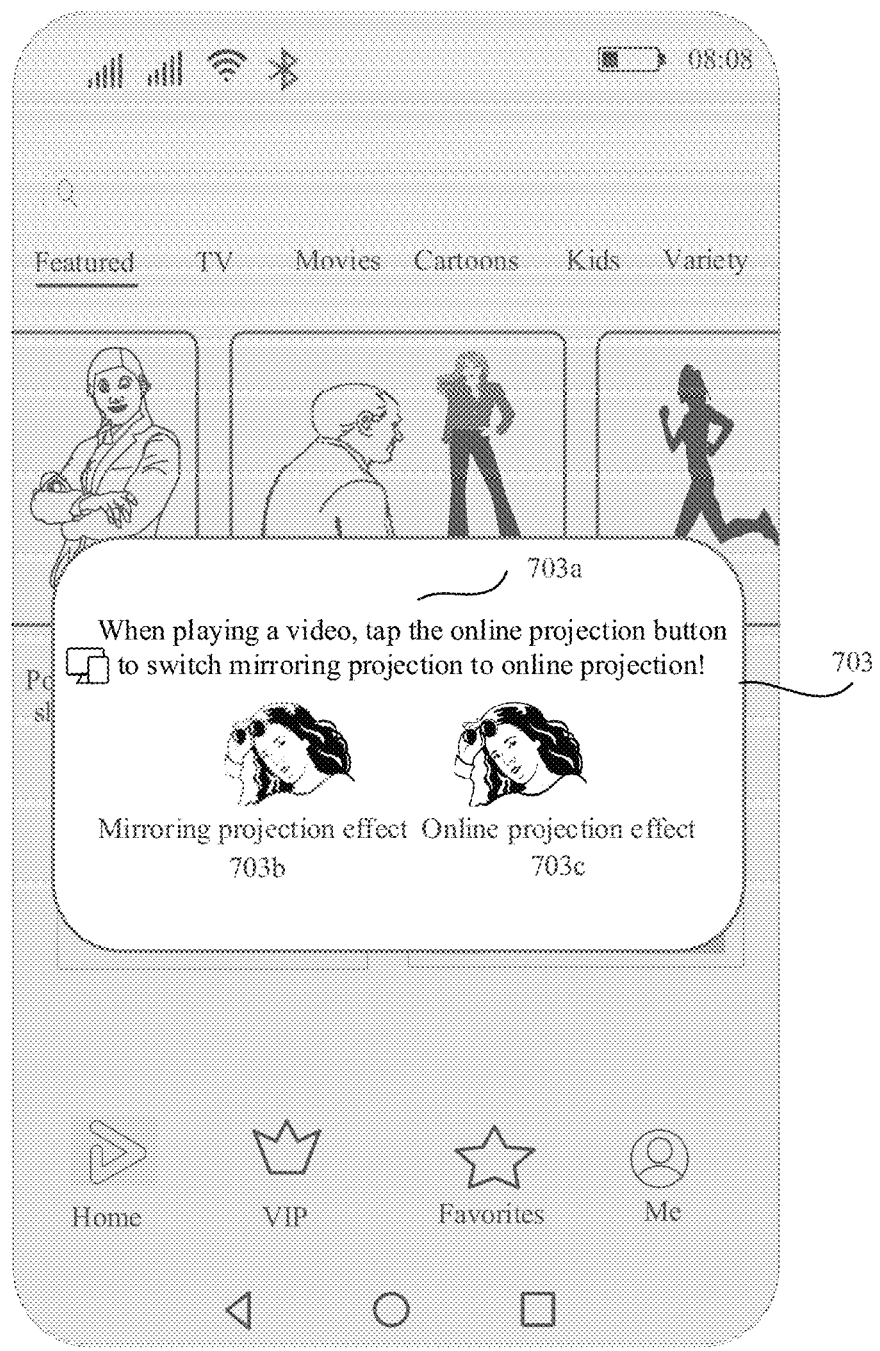

FIG. 8A shows an example of the prompt information displayed by the mobile device 100 in Scenario 1. The prompt information is a window 703. The window 703 may include text 703a. For example, the text 703a may be: "When playing a video, tap the online projection button to switch mirroring projection to online projection", or "when playing a video, tap the online projection button to obtain a clearer projection effect".

In some embodiments, the window 703 may further include an image 703b and an image 703c. The image 703b and the image 703c are respectively used for indicating effects of sharing a network video based on mirroring projection and online projection. It can be learned that the image 703c is clearer and has a better effect than the image 703b. In this way, the user can be prompted with a difference between mirroring projection and online projection, so that the user selects more suitable online projection to share the network video. The prompt information displayed by the mobile device 100 on the display may automatically disappear after being displayed for a period of time (for example, 5 seconds), without user interaction. The mobile device 100 may further stop displaying the prompt information or the like in response to an operation of tapping a region other than a region of the prompt information on the display by the user. It may be understood that when the prompt information is output in Scenario 1, the mobile device 100 may sequentially display FIG. 7A, FIG. 8A, FIG. 7B, and FIG. 7C based on user operations. In this way, after the user opens a specific video application, the user may be automatically prompted to trigger the mobile device 100 to switch mirroring projection to online projection. This ensures optimal projection experience when the user watches a network video. "9:21" in FIG. 7C is used for representing a previous playing record. To be specific, when the network video is previously played up to "9:21", playing of the network video is exited.

Scenario 2: After starting a video application and playing a network video selected by the user, the mobile device 100 outputs the prompt information.

Figure 8B:
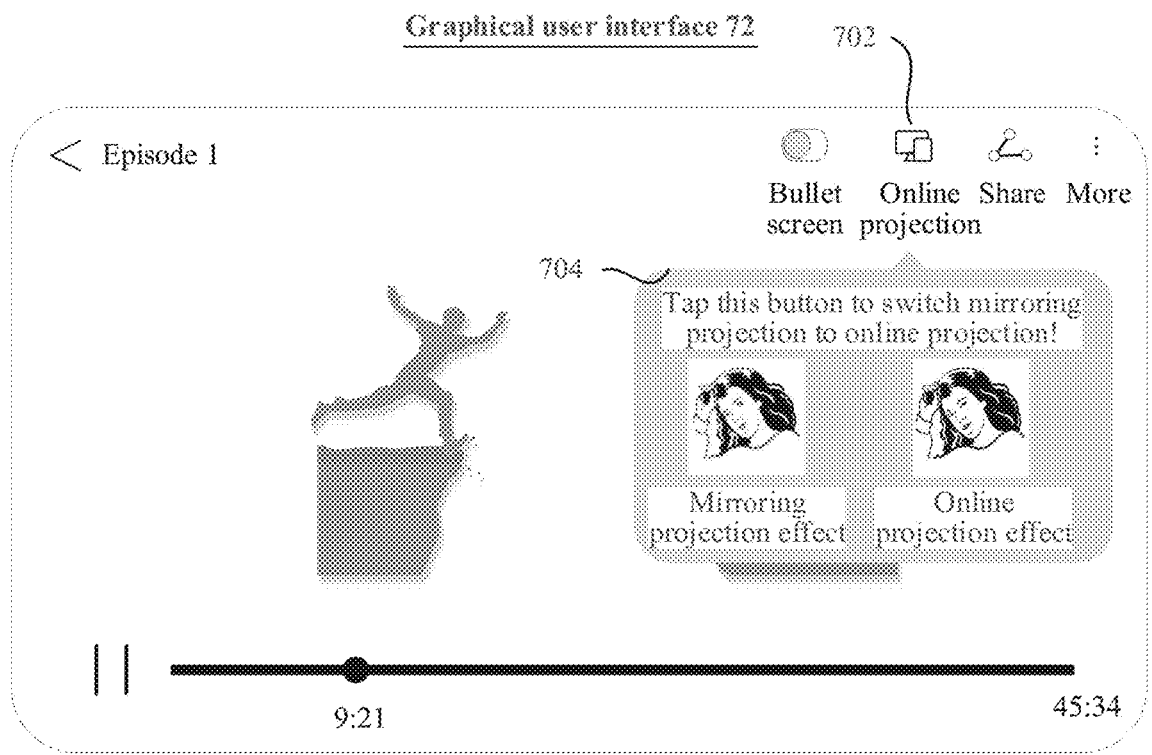

Similarly, when the mobile device 100 identifies, in a manner of S009, or S009 and S010, that an application that is run by the mobile device 100 in the foreground is a non-customized video application, the mobile device 100 outputs the prompt information. FIG. 8B shows an example of the prompt information displayed by the mobile device 100 in Scenario 2. As shown in FIG. 8B, the prompt information is a window 704. Specific content of the prompt information is similar to that of the window 703 in FIG. 8A, and details are not described again. It may be understood that w % ben the prompt information is output in Scenario 2, the mobile device 100 may sequentially display FIG. 7A, FIG. 7B, FIG. 7C, and FIG. 8B based on user operations. In this way, after a specific network video starts to be played, the user may be automatically prompted to trigger the mobile device 100 to switch mirroring projection to online projection. This ensures optimal projection experience when the user watches the network video. Optionally, in FIG. 8B, if the online projection button is not tapped within preset duration, the window 703 is closed. Optionally, in FIG. 8B, if the online projection button is not tapped within preset duration (for example, 20 seconds), a mirroring projection mode is still used, or is automatically switched to an online projection mode. The foregoing 20 seconds are merely an example, and any duration may be the preset duration. This is not limited in this disclosure.

Scenario 3: After keeping running a video application in the foreground for duration longer than first preset duration, the mobile device 100 outputs the prompt information.

When the mobile device 100 identifies, in a manner of S009, or S009 and S010, that an application that is run by the mobile device 100 in the foreground is a non-customized video application, and the application is kept running in the foreground for the duration longer than the first preset duration, the mobile device 100 outputs the prompt information. The first preset duration may be, for example, 10 seconds, 30 seconds, or 1 minute. This is not limited in embodiments of this disclosure. After the mobile device 100 keeps running the video application in the foreground for the duration longer than the first preset duration, the mobile device 100 may still display a home page provided by the video application, or may play a network video in response to an operation for selecting the network video by the user. Therefore, as shown in FIG. 8A, the prompt information displayed by the mobile device 100 may be displayed on the home page 71, of the video application, shown in FIG. 7B. As shown in FIG. 8B, the prompt information may alternatively be displayed in the user interface 72 shown in FIG. 7C. In this way, in a process in which the user watches the network video, the user may be prompted to trigger the mobile device 100 to switch mirroring projection to online projection. This ensures optimal projection experience when the user watches the network video.

Unless otherwise specified, or there is no conflict, content that is not described in Scenario 2 and Scenario 3 is the same as content in Scenario 1, and details are not described herein again.

S102: The mobile device 100 receives a user operation for enabling the online projection function.

Figure 8C:
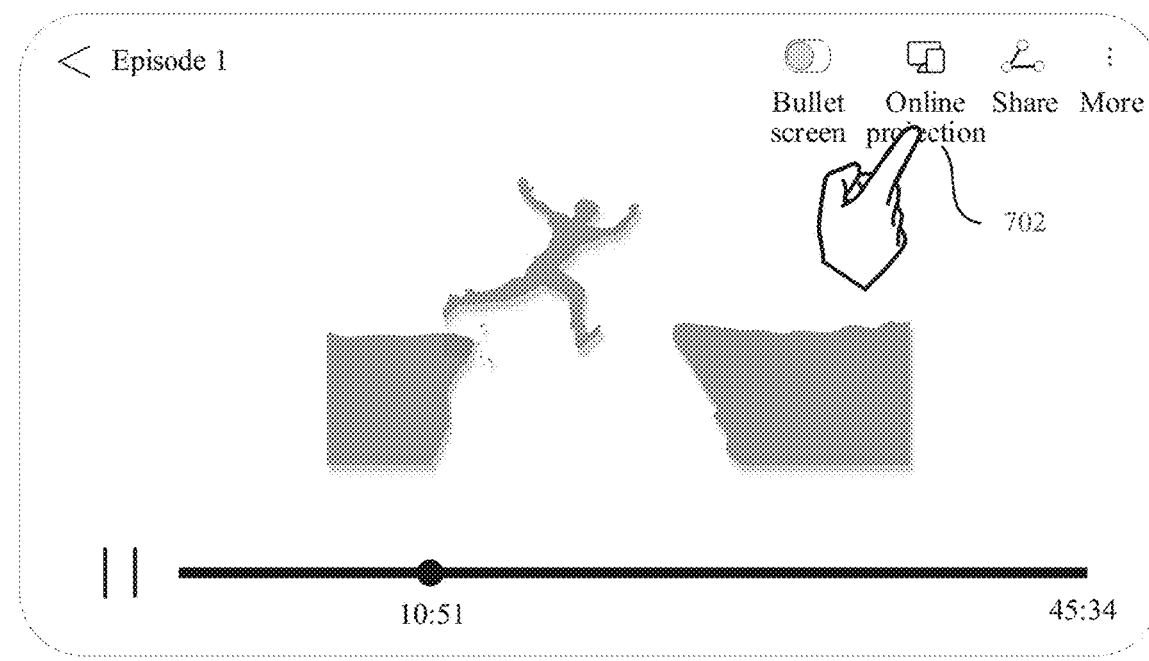

For example, as shown in FIG. 8C, the user operation for enabling the online projection function of the video application may be, for example, a user operation (for example, a tap operation or a touch operation) performed on an online projection control 702. The user operation for enabling the online projection control may alternatively be in another form, for example, a shake gesture or a voice instruction. This is not limited in embodiments of this disclosure.

S103 to S108: In response to the user operation for the online projection function, the mobile device 100 switches mirroring projection to online projection, and continues to share the network video with the electronic device 200 based on online projection.

The mobile device 100 may enable the online projection function of the video application in response to the user operation for enabling the online projection function of the video application in S102.

S103: The mobile device 100 discovers a nearby electronic device supporting online projection, and displays an identifier of the discovered electronic device.

Figure 8D:
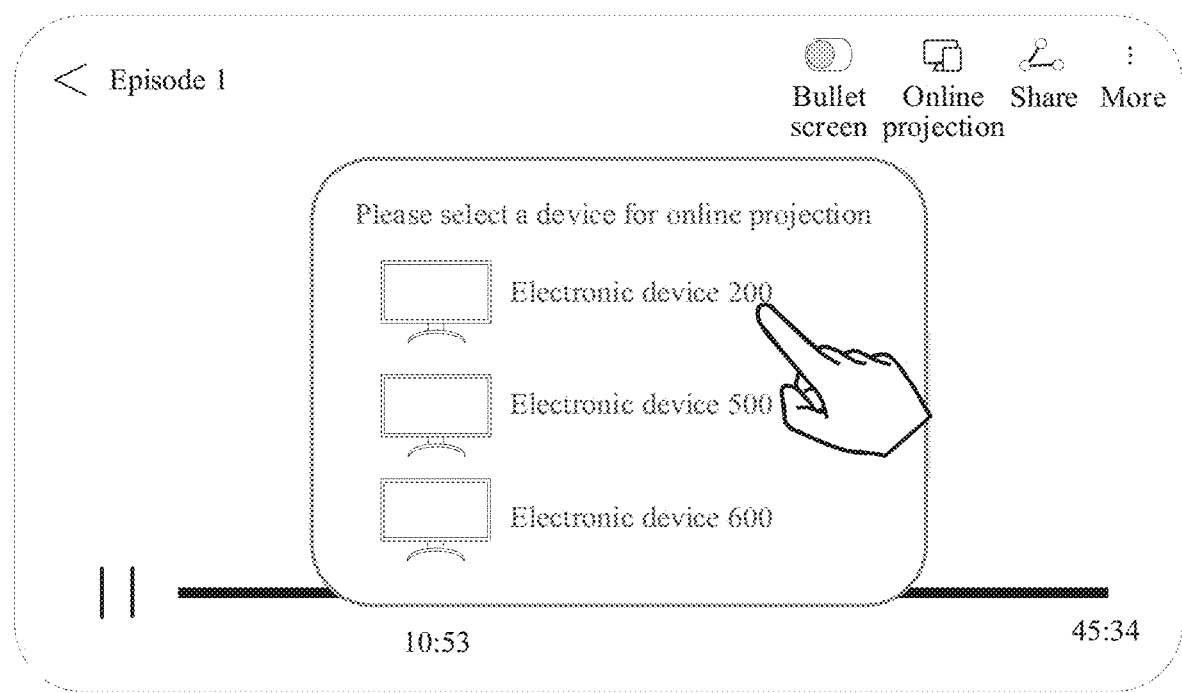

For example, the mobile device 100 may send a user datagram protocol (user datagram protocol, UDP) broadcast. Nearby electronic devices that support online projection, for example, the electronic device 200 connected to the Wi-Fi access point 300, and another electronic device (not shown in the figure), each may respond to the UDP broadcast with a UDP packet that carries related information (for example, a device identifier) of the electronic device, so that the mobile device 100 discovers the electronic device. After discovering the nearby electronic device supporting online projection, the mobile device 100 displays the identifier of the discovered electronic device, and may further display other information such as an image of the electronic device. This is not limited in embodiments of this disclosure. FIG. 8D shows an example of a user interface displayed by the mobile device 100 in response to a user operation that is detected in S101 and that is for enabling the mirroring projection function. As shown in FIG. 8D, the identifier of the electronic device discovered by the mobile device 100 may be displayed in the user interface.

S104: The mobile device 100 detects a user operation for selecting the electronic device 200.

For example, as shown in FIG. 8D, the user operation for selecting the electronic device 200 may be a user operation performed on an identifier that corresponds to the electronic device 200 and that is in the user interface shown in FIG. 8D. The user operation for selecting the electronic device 200 may alternatively be implemented in another form. This is not limited in embodiments of this disclosure.

In an implementation, when the mobile device 100 enables the online projection function of the video application for the first time, the mobile device performs S103 and S104, to share, based on online projection, a network video with the electronic device selected by the user.

In another implementation, when the mobile device 100 enables the online projection function of the video application for the non-first time, the mobile device 100 automatically shares, through online projection, a network video with the electronic device previously connected for online projection. In other words, in another implementation, S103 and S104 may not be performed, but S105 and subsequent steps are directly performed after S102.

In still another implementation, when detecting that there is only one nearby electronic device supporting online projection, the mobile device 100 automatically performs wireless projection onto the electronic device in the online projection mode, to share a network video.

S105: The mobile device 100 establishes a transmission control protocol (transmission control protocol, TCP) connection to the electronic device 200.

S106: The mobile device 100 sends a website address of the played network video to the electronic device 200 through the TCP connection.

Herein, the website address of the network video may be a URL, and the URL is used for locating a server corresponding to the video application, for example, the server 400.

In some embodiments, the mobile device 100 may further send a time node of the currently played network video to the electronic device 200, so that the electronic device 200 continues to play the network video from the time node.

In some embodiments, in response to the user operation that is detected in S102 and that is for enabling the online projection function, after establishing the TCP connection to the electronic device 200 and sending the website address of the network video to the electronic device 200, the mobile device 100 may further change a display form of the control 702, for example, add a shadow, or change a color of the control 702. In this way, the user may be prompted that the mobile device 100 is currently sharing the network video based on online projection. In another embodiment, the mobile device 100 may alternatively prompt, in a manner such as displaying text, the user that the mobile device 100 is currently sharing the network video based on online projection. This is not limited in embodiments of this disclosure.

S107: The electronic device 200 obtains the network video from the website address of the network video.

The electronic device 200 may request, based on the website address, to obtain the network video from the server 400. The server 400 may encode the network video, and send an encoded network video to the electronic device 200 through a network (for example, the local area network constructed by the Wi-Fi access point 300) in response to the request.

S108: The electronic device 200 plays the network video.

In a process in which the mobile device 100 shares the network video with the electronic device 200 based on online projection, the user may continue to control the mobile device 100, and controlling the mobile device 100 by the user does not affect the electronic device 200 to continue playing the network video. For example, the user may control the mobile device 100 to exit playing the network video, exit running the video application, and start a game application.

According to the foregoing steps S101 to S108, when the user selects unsuitable mirroring projection to share the network video, the mobile device 100 may switch mirroring projection to online projection. This improves projection efficiency, and can ensure quality of playing the network video by the electronic device 200, so that optimal projection experience of the user is ensured. In other words, the projection method shown in FIG. 5B can reduce a user threshold and ensure user experience.

In some embodiments, the mobile device 100 may further switch online projection back to mirroring projection in some cases. The following describes, through optional step S109, a case of switching online projection back to mirroring projection.

S109: After it is detected that the game application is started, or after it is detected that the game application is switched to run in the foreground, the mobile device 100 switches online projection to mirroring projection with a trigger of the user.

Specifically, after the mobile device 100 detects, in a manner of S009, or S009 and S010, that the application that is run by the mobile device 100 in the foreground is the game application, the mobile device 100 may output prompt information, where the prompt information may be used for asking the user whether to switch online projection to mirroring projection.

Figure 8E:
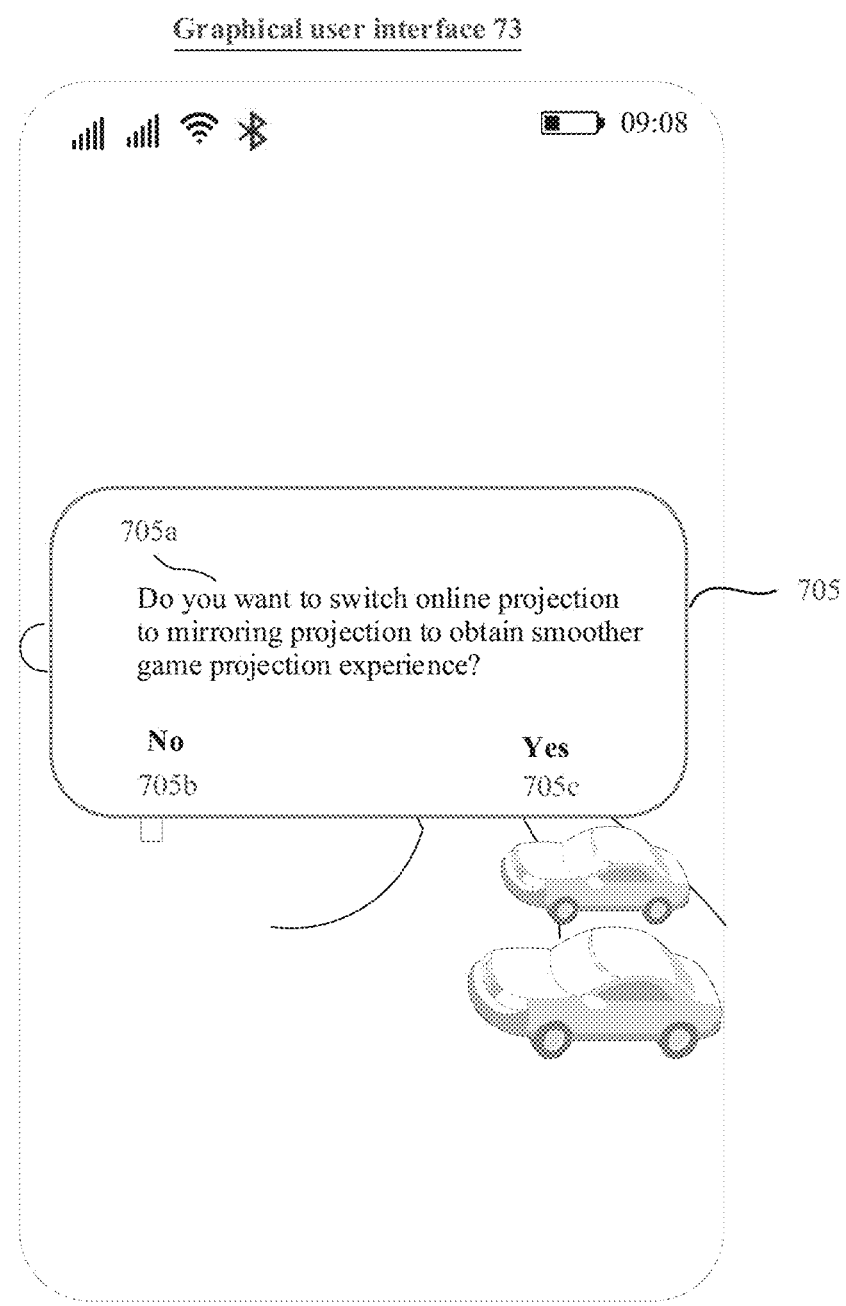

FIG. 8E shows an example of the prompt information displayed after the mobile device 100 starts the game application. As shown in FIG. 8E, the prompt information may be a window 705. The window 705 may include text 705a, a control 705b, and a control 705c. For example, the text 705a may be: "Do you want to switch online projection to mirroring projection to obtain smoother game projection experience?", to ask the user whether to switch online projection to mirroring projection. The control 705b is configured to detect a user operation. In response to the user operation, the mobile device 100 may not perform an operation for switching online projection mirroring projection. The control 705c is configured to detect a user operation. In response to the user operation, the mobile device 100 may switch online projection to mirroring projection. For the operation of switching online projection to mirroring projection by the mobile device 100, refer to S002 to S007 in the method shown in FIG. 5A Details are not described herein again.

In this way, on the premise of wireless projection, when the application that is run in the foreground is switched to the game application, or when the game application is started, the mobile device 100 automatically prompts the user to switch online projection back to mirroring projection. If the user chooses to switch online projection back to mirroring projection, smoother game projection experience with a lower latency is provided for the user. If the user chooses to refuse to switch online projection back to mirroring projection, the user may not only watch a network video on the electronic device 200, but also play a game on the mobile device 100.

In a replacement manner, S109 may alternatively be replaced with the following step: After it is detected that the game application is started, or after it is detected that the game application is switched to run in the foreground, the mobile device automatically switches back to mirroring projection. In this way, the user does not need to perform selection, and the mobile device is automatically switched back to mirroring projection, so that user experience is better.

Figure 5C:
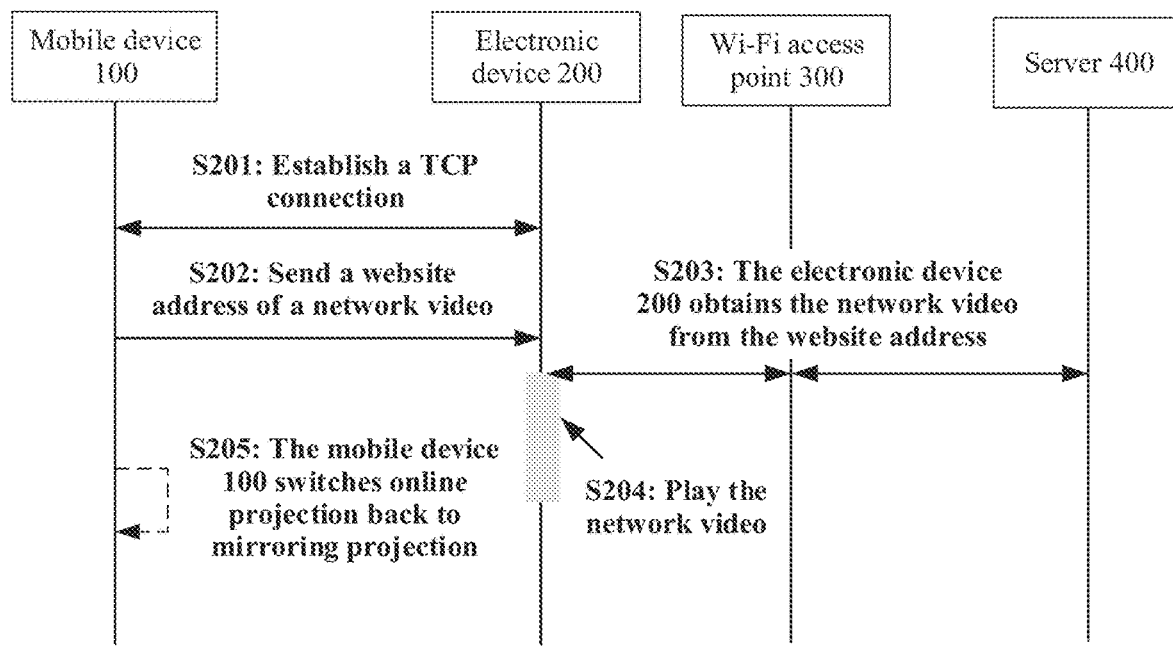

The following describes the procedure in FIG. 5C. FIG. 5C describes a procedure of switching mirroring projection currently used by the mobile device 100 to online projection for the customized video application. In FIG. 5C, when the mobile device 100 shares, with the electronic device 200 through mirroring projection, a network video provided by the customized video application, the mobile device 100 may automatically or with a trigger of the user, switch mirroring projection to online projection, and continue to share the network video based on online projection. The procedure shown in FIG. 5C may include the following steps.

S201 to S204: In a process in which the mobile device 100 plays the network video, the mobile device 100 automatically or with a trigger of the user, switches mirroring projection to online projection, and continues to share the network video with the electronic device 200 based on online projection.

S201: The mobile device 100 directly establishes a TCP connection to the electronic device 200.

The video application is the customized video application. In a process in which the mobile device 100 runs the video application and plays the network video, the video application may query a projection status from a projection service through an SDK interface, and may further find that a device currently sharing the network video with the mobile device 100 is the electronic device 200. Therefore, in S201, the mobile device 100 may directly establish the TCP connection to the found electronic device 200, without a need of selection by the user or selection by the mobile device 100 by default based on previous online projection interaction in FIG. 5A.

S202 to S204 are the same as S106 to S108 in FIG. 5B, and details are not described herein again.

In an implementation, S201 to S204 are automatically performed.

In some embodiments, the mobile device 100 may output prompt information before automatic switching, to prompt the user that the mobile device 100 is to switch mirroring projection to online projection.

In some embodiments, the mobile device 100 may output prompt information after automatic switching, to prompt the user that mirroring projection has been currently switched to online projection.

Implementation forms of the prompt information output by the mobile device 100 before and after switching may include but are not limited to an interface element displayed on the display, audio, indicator blinking, a motor vibration, and the like.

Figure 8F:
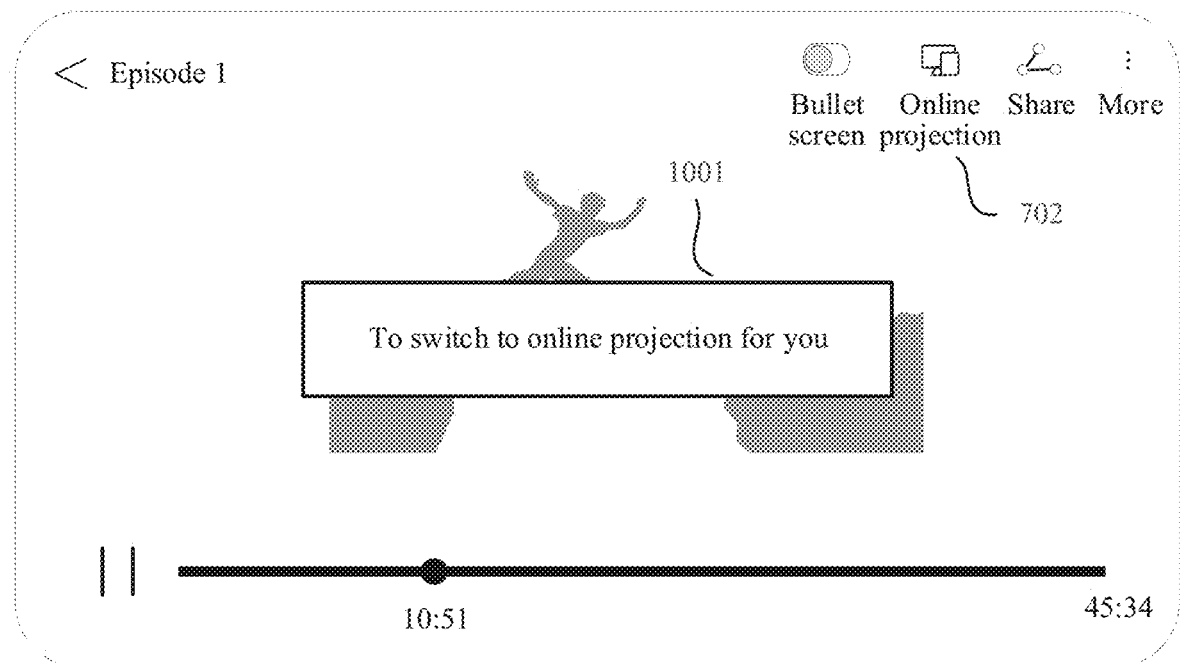
Figure 8G:
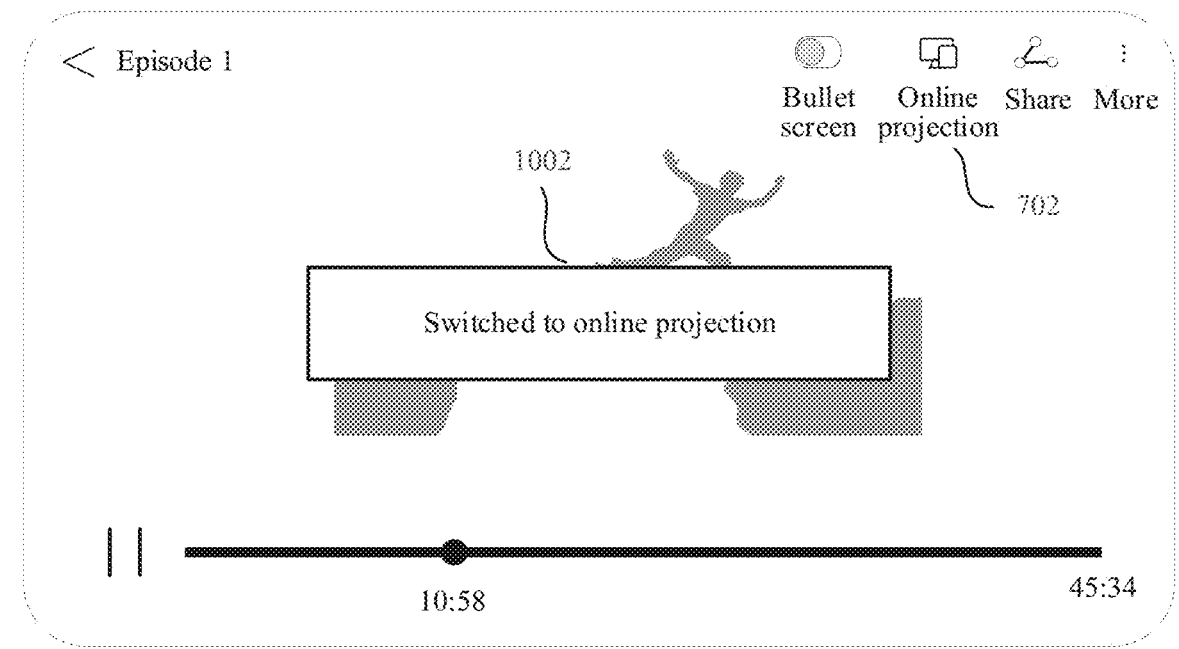

FIG. 8F shows an example of prompt information 1001 displayed before the mobile device 100 automatically performs switching. The prompt information 1001 is text "to switch to online projection for you". FIG. 8G shows an example of prompt information 1002 displayed after the mobile device 100 automatically performs switching. The prompt information 1002 is text "switched to online projection".

In another implementation, the mobile device 100 may not output prompt information before or after automatic switching. This is not limited in embodiments of this disclosure.

In this way, not only projection efficiency can be improved and optimal projection experience of the user can be ensured, but also user operations can be reduced, so that it is simpler and more convenient for the user.

In another implementation, when the mobile device 100 identifies, in a manner of S009, or S009 and S010, that an application that is run by the mobile device 100 in the foreground is a customized video application, the mobile device 100 outputs prompt information, and switches mirroring projection to online projection with a trigger of the user.

Figure 8H:
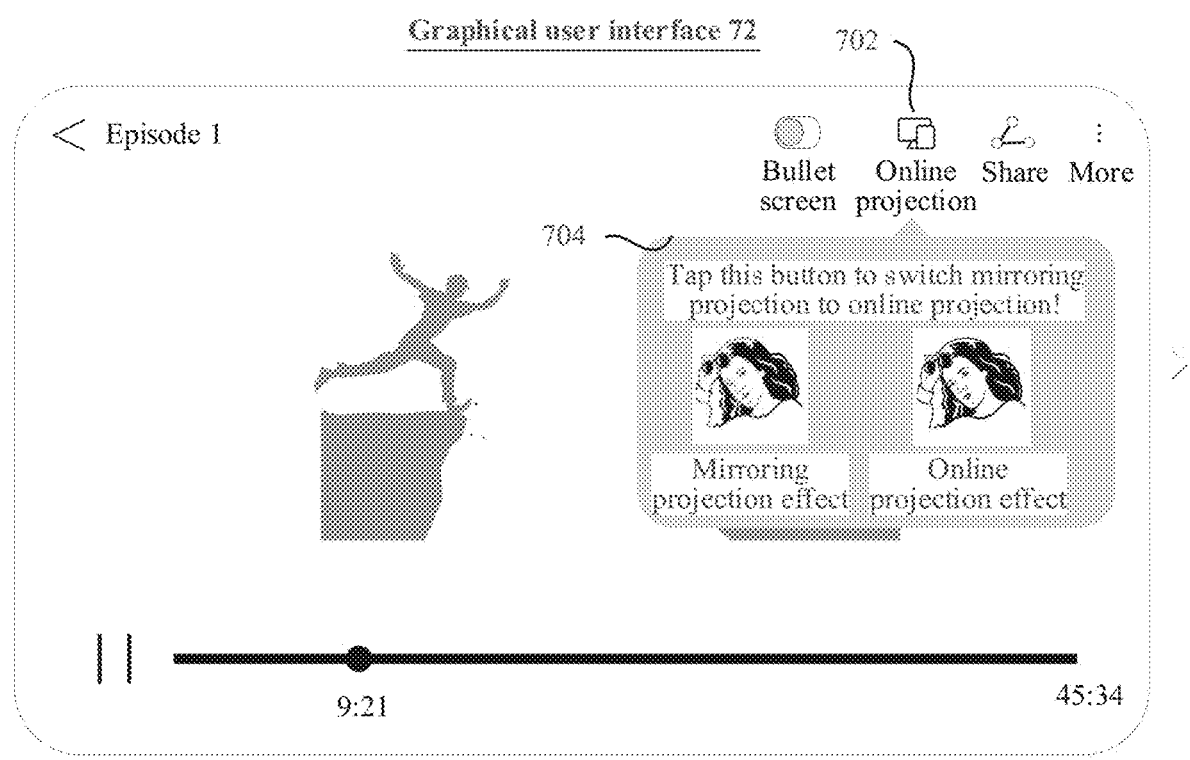

FIG. 8H shows an example of prompt information output when the mobile device 100 identifies playing of a network video. The prompt information in FIG. 8H is the same as that in FIG. 8B, and details are not described herein again. For example, as shown in FIG. 8H, the mobile device 100 may detect a user operation (for example, a tap operation or a touch operation) performed on the control 702, and switch mirroring projection to online projection in response to the user operation. The foregoing is not limited thereto. The mobile device 100 may alternatively switch mirroring projection to online projection in response to another user operation, for example, a shake gesture or a voice instruction. This is not limited in embodiments of this disclosure.

In some embodiments, after switching mirroring projection to online projection in response to the user operation, the mobile device 100 may change a display manner of the control 702, to prompt the user that mirroring projection has been currently switched to online projection. In this way, the user can be given sufficient selection rights during switching.

In some embodiments, after S202 to S204, the mobile device 10 may further switch online projection back to mirroring projection in some cases. In other words, an optional step S205 may be further included.

S205: The mobile device 100 switches online projection back to mirroring projection.

Figure 9:
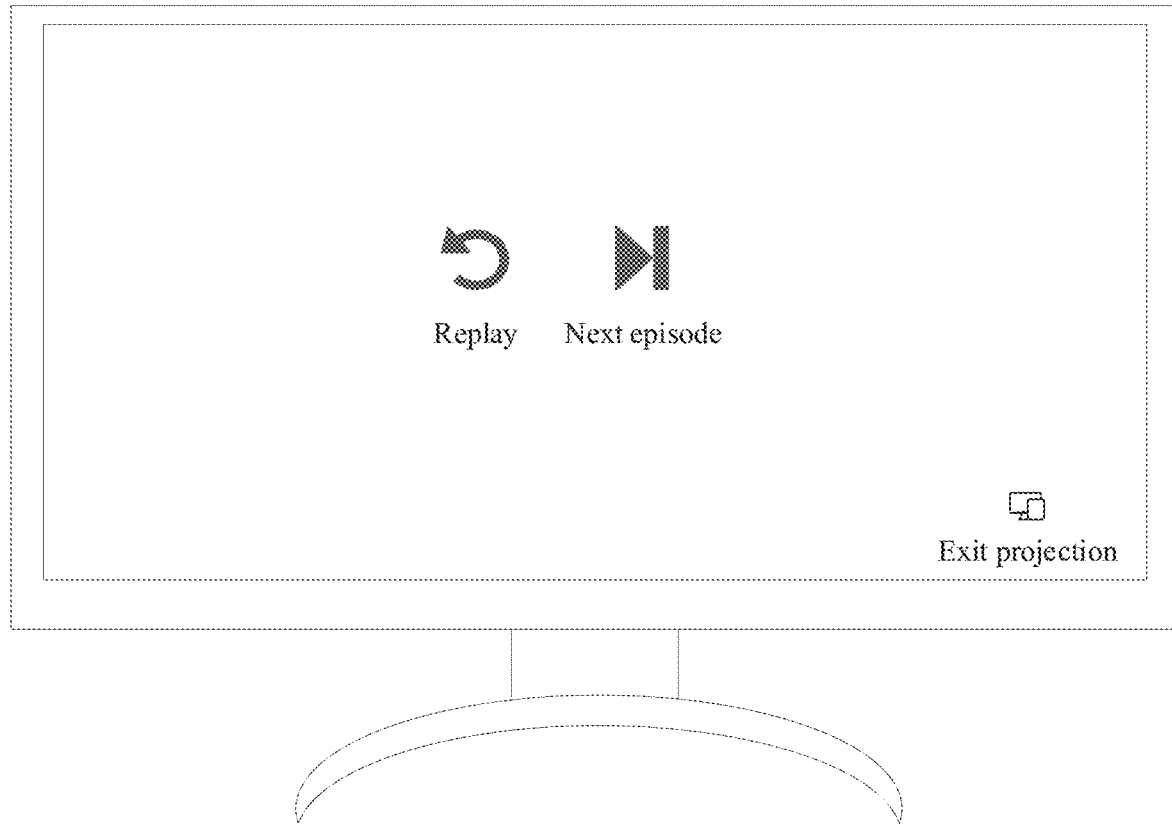
FIG. 9 is a schematic diagram of a user interface of an electronic device in a wireless projection method according to an embodiment of this disclosure.

In an implementation, in S205, after the electronic device 200 plays the network video, the mobile device 100 may automatically switch online projection back to mirroring projection. In some cases, after the electronic device 200 plays the network video, the user needs to further operate the electronic device 200 to repeatedly play the network video or play another network video. FIG. 9 shows an example of a user interface displayed after the electronic device 200 plays the network video. In this way, the mobile device 100 can adaptively adjust a used wireless projection mode, to provide optimal projection experience for the user. In addition, the mobile device 100 can automatically perform mutual switching between online projection and mirroring projection in the background, without a need of a user operation. This can provide good projection experience for the user.

In another implementation, in S205, after it is detected that the game application is started, or after it is detected that the game application is switched to run in the foreground, the mobile device 100 may switch online projection back to mirroring projection with a trigger of the user. For specific details, refer to the related description in S109. Details are not described herein again.

In the embodiments shown in FIG. 5A to FIG. 5C, the non-customized video application may be referred to as a first-type application, the game application may be referred to as a second-type application, and the customized video application may be referred to as a third-type application.

The application started by the mobile device 100 in S008 in FIG. 5A may be referred to as a first application.

The prompt information output by the mobile device 100 in S101 in FIG. 5B may be referred to as first prompt information. The user operation that is for enabling the online projection function and that is received by the mobile device 100 in S102 may be referred to as a first user input. The user operation that is for selecting the electronic device 200 and that is detected by the mobile device 100 in S104 may be referred to as a second user input. The application that is started or switched to run in the foreground and that is detected by the mobile device 100 in S109 may be referred to as a second application. The game application may be referred to as the second-type application. The prompt information output by the mobile device 100 in S109 may be referred to as second prompt information.

After the method shown in FIG. 5A or FIG. 5B, the mobile device 100 may further switch the first application that belongs to the first-type application to run in the foreground, or start a third application that belongs to the first-type application, or switch a third application that belongs to the first-type application to run in the foreground; and automatically output third prompt information, where the third prompt information is used for giving a prompt for switching a first wireless projection mode to a second wireless projection mode. Alternatively, the mobile device 100 automatically switches a first wireless projection mode to a second wireless projection mode, and performs wireless projection onto the electronic device 200 in the second wireless projection mode.

With reference to the software structure (for example, the software structure shown in FIG. 3B) of the mobile device 100, the following describes in detail a procedure of interaction between internal modules when the mobile device 100 performs the procedure in FIG. 5B. It should be noted that, although the software structure shown in FIG. 3B is used as an example for description herein, a person skilled in the art should learn that another operating system (such as Harmony) is also applicable.

Figure 10A:
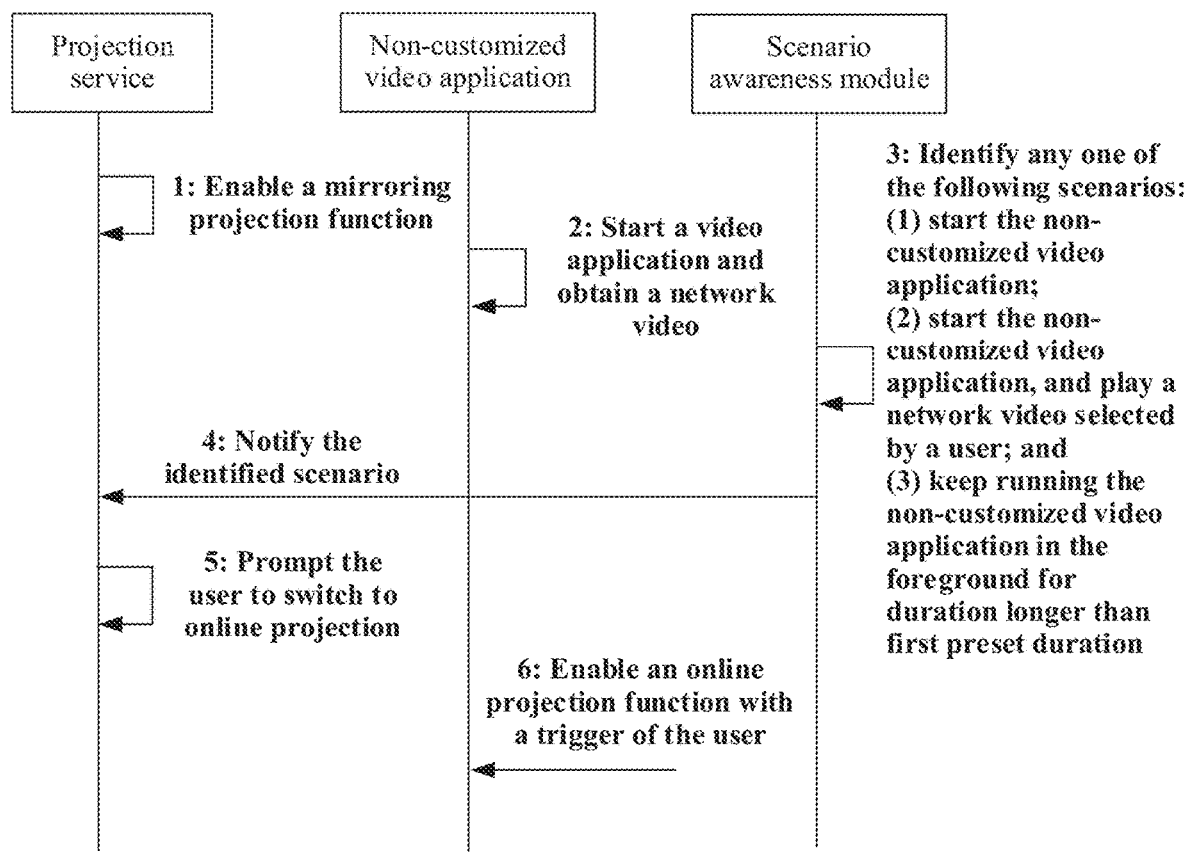
FIG. 10A and FIG. 10B are schematic diagrams of interaction between internal modules of a mobile device in a wireless projection method according to an embodiment of this disclosure.

FIG. 10A shows the procedure of interaction between internal modules when the mobile device 100 performs the procedure shown in FIG. 5B. As shown in FIG. 10A, the following steps may be included.

Step 1: The projection service enables a mirroring projection function.

In step 1, after the mobile device 100 detects a user operation for enabling the mirroring projection function, the projection service invokes one or more of Wi-Fi direct, Bluetooth, or NFC in the wireless communication module 160, discovers, by using one or more of Wi-Fi direct, Bluetooth, or NFC, an electronic device onto which mirroring projection can be performed near the mobile device 100, establishes a communication connection to the electronic device 200 selected by the user, and shares multimedia content with the electronic device 200.

Step 2: Start a video application and obtain a network video.

For implementation of step 2, refer to the related descriptions in FIG. 7A to FIG. 7C. Details are not described herein again.

In step 2, after detecting a user operation used for starting the video application, the mobile device 100 starts the video application, and then obtains the network video in response to a user operation for selecting the network video by the user for playing.

Step 3: The scenario awareness module identifies any one of three scenarios.

The three scenarios are the three scenarios mentioned in S101 in FIG. 5B, and may specifically include: (1) The mobile device 100 starts a non-customized video application; (2) the mobile device 100 starts a non-customized video application, and plays a network video selected by the user from the application; and (3) the mobile device 100 keeps running a non-customized video application in the foreground for duration longer than first preset duration.

The scenario awareness module may identify, in real time or periodically in a manner of S009, or S009 and S010, whether an application that is run by the mobile device 100 in the foreground is a non-customized video application, and then identify the foregoing three scenarios.

In some embodiments, the scenario awareness module may be integrated into the projection service. In this way, the projection service may be configured to perform step 3.

Step 4: The scenario awareness module notifies the projection service of the identified scenario.

Step 5: After learning the scenario identified by the scenario awareness module, the projection service outputs prompt information, to prompt the user to switch to online projection.

Specifically, when learning that the mobile device 100 enables the mirroring projection function and the mobile device 100 is in one of the foregoing three scenarios, the projection service invokes hardware of the mobile device 100, for example, a display, a flash, or a motor, to output the prompt information, where the prompt information is used for prompting the user to switch mirroring projection to online projection. For an implementation form of the prompt information, refer to the related description in S101.

Step 6: The video application enables an online projection function with a trigger of the user.

For step 6, refer to the related descriptions in S102 to S106 in FIG. 5B.

Specifically, the video application may receive an event that the user enables the online projection function of the video application. For example, as shown in FIG. 8C, the user may tap the control 702. The tap operation may be encapsulated into the event of enabling the online projection function of the video application, and is transferred from a bottom layer to the video application. Afterwards, the video application may enable the online projection function. To be specific, the wireless communication module 160 is invoked to send a UDP broadcast, establish a TCP connection to the electronic device 200, and send a website address of the network video to the electronic device 200 through the TCP connection.

Figure 10B:
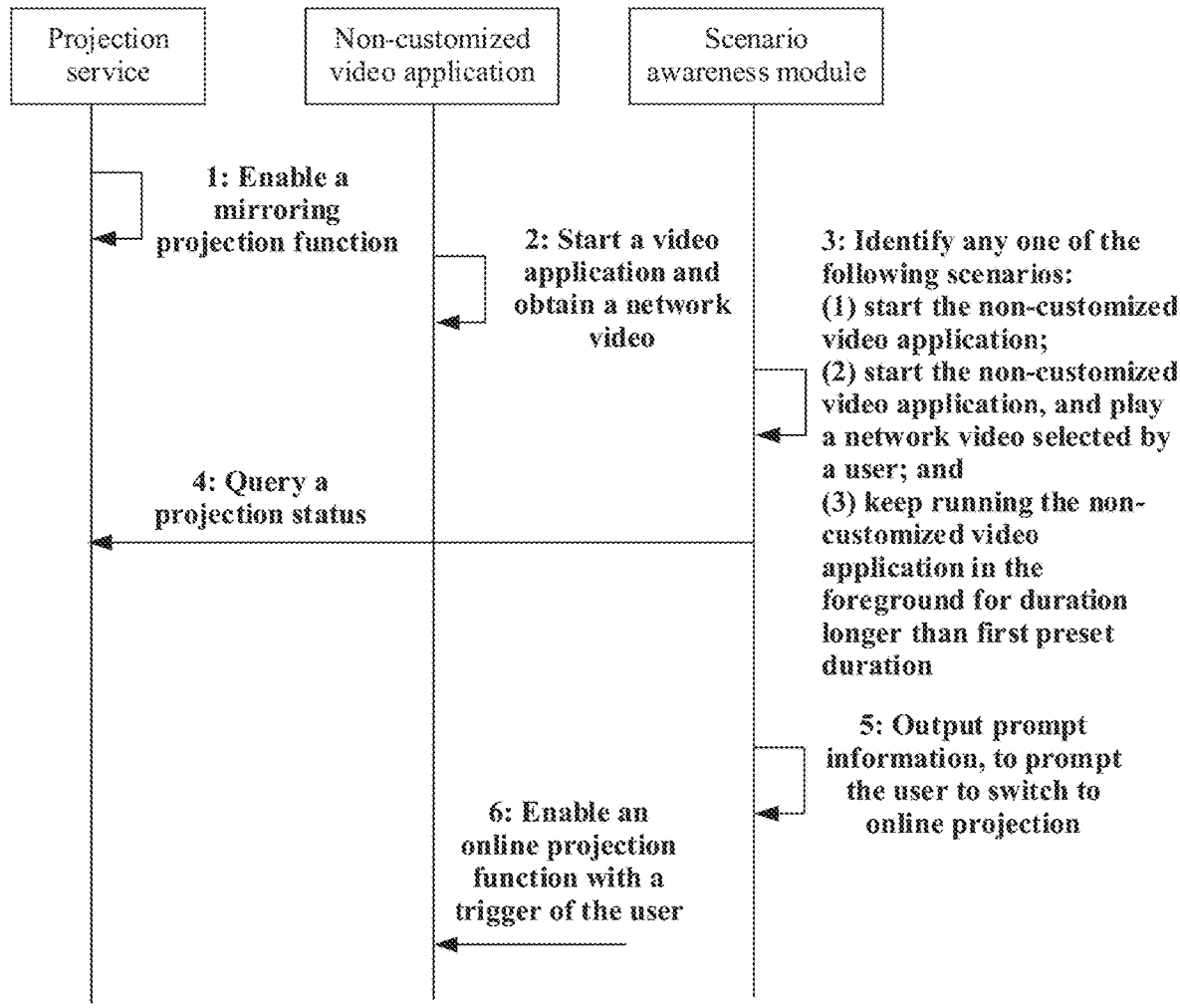

FIG. 10B shows another procedure of interaction between internal modules when the mobile device 100 performs the procedure shown in FIG. 5B. As shown in FIG. 10B, the following steps may be included.

Step 1 to step 3 are the same as step 1 to step 3 in FIG. 10A, and details are not described herein again.

Step 4: The scenario awareness module queries a projection status of the mobile device 100 from the projection service.

Specifically, the scenario awareness module may find, through querying from the projection service, that the mobile device 100 currently enables a mirroring projection function.

When learning that the mobile device 100 enables the mirroring projection function and the mobile device 100 is in one of the three scenarios in S101, the scenario awareness module invokes hardware of the mobile device 100, for example, a display, a flash, or a motor, to output prompt information, where the prompt information is used for prompting the user to switch mirroring projection to online projection. For an implementation form of the prompt information, refer to the related description in S101.

Step 5 is the same as step 5 in FIG. 10A, and details are not described herein again.

It may be understood that, in the examples in FIG. 10A and FIG. 10B, a function of the scenario awareness module may be integrated into the projection service. When the function of the scenario awareness module is integrated into the projection service, steps performed by the scenario awareness module in FIG. 10A and FIG. 10B are all performed by the projection service, and steps of interaction between the scenario awareness module and the projection service may also be omitted.

Figure 11:
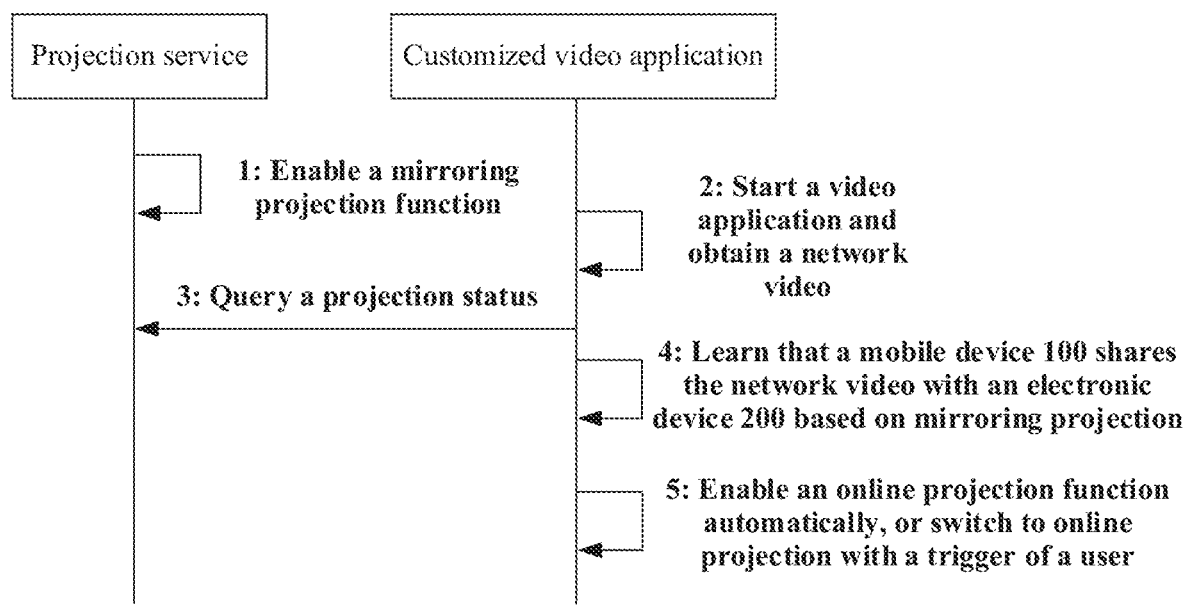
FIG. 11 is a schematic diagram of interaction between internal modules of a mobile device in a wireless projection method according to an embodiment of this disclosure.

With reference to the software structure (for example, the software structure shown in FIG. 3B) of the mobile device 100, the following describes in detail a procedure of interaction between internal modules when the mobile device 100 performs the procedure in FIG. 5C. It should be noted that, although the software structure shown in FIG. 3B is used as an example for description herein, a person skilled in the art should learn that another operating system (such as Harmony) is also applicable. As shown in FIG. 11, the following steps may be included.

1: The projection service enables a mirroring projection function.

2: Start a video application and obtain a network video.

Step 1 to step 2 are the same as step 1 to step 2 in FIG. 10A, and details are not described herein again.

3: The video application queries a projection status from the projection service.

The video application may query a current projection status from the projection service by using the SDK, and learn that the mobile device 100 is currently sharing the network video based on mirroring projection. In some embodiments, the video application may find, through querying from the projection service by using the SDK, the electronic device 200 that is currently accepting projection from the mobile device 100.

4: The video application learns that the mobile device 100 shares the network video with the electronic device 200 based on mirroring projection.

With reference to step 2 and step 3, the video application may learn that the mobile device 100 currently shares the network video with the electronic device 200 based on mirroring projection.

5: The video application enables an online projection function automatically or with a trigger of the user.

In some embodiments, before or after the video application automatically switches mirroring projection to online projection, the video application may further invoke a module such as a display, an audio module, or a flash, to output prompt information. For an implementation form of the prompt information, refer to the related descriptions in FIG. 8F and FIG. 8G.

In some other embodiments, after learning that the mobile device 100 currently shares the network video with the electronic device 200 based on mirroring projection, the video application may invoke the display to output the prompt information to prompt the user to switch mirroring projection to online projection, and after the user enters a user operation for enabling online projection, enable the online projection function. Herein, for a manner in which the display outputs the prompt information to prompt the user to switch mirroring projection to online projection, refer to the window 704 in FIG. 8H.

Specifically, the video application enables the online projection function. To be specific, the wireless communication module 160 is invoked to send a UDP broadcast, establish a TCP connection to the electronic device 200, and send a website address of the network video to the electronic device 200 through the TCP connection.

In this way, when the video application started by the mobile device 100 is a non-customized video application, the scenario awareness module may sense the three scenarios mentioned in S101; and then the scenario awareness module or the projection service may output prompt information to prompt the user to switch mirroring projection to online projection. Afterwards, the video application may enable the online projection function in response to a user operation entered by the user after the user views the prompt information. When the video application started by the mobile device 100 is a customized video application, the customized video application may learn a projection status from the projection service through the SDK interface, and may identify, with reference to a running status of the customized video application, a scenario in which the mobile device 100 shares the network video based on mirroring projection. Therefore, the video application may automatically or passively enable the online projection function.

In other words, to perform the procedure shown in FIG. 5B, the video application does not need to be improved, but only the software system of the mobile device 100 needs to be improved. A function of switching mirroring projection to online projection in a process of sharing a network video based on mirroring projection can be implemented, provided that the scenario awareness module is added, and a prompt information outputting function of the projection service or the scenario awareness module is added. To perform the procedure shown in FIG. 5C, the video application needs to be improved, and the SDK is added, so that a function of switching mirroring projection to online projection in a process of sharing a network video based on mirroring projection can be implemented.

In some embodiments, the customized video application and the non-customized video application may not be distinguished. The mobile device 100 uses the procedure shown in FIG. 5B to switch the wireless projection mode, provided that the application started by the mobile device 100 is a video application.

It should be noted that the wireless projection method provided in this disclosure does not necessarily include the procedures shown in FIG. 5A, FIG. 5B, and FIG. 5C. The procedures shown in FIG. 5A, FIG. 5B, and FIG. 5C, and parts of the foregoing text corresponding to the procedures shown in FIG. 5A, FIG. 5B, and FIG. 5C may separately constitute the wireless projection method provided in embodiments of this disclosure. For example, the procedures shown in FIG. 5A and FIG. 5B, and the foregoing text corresponding to the procedures shown in FIG. 5A and FIG. 5B, for another example, the procedures shown in FIG. 5A and FIG. 5C, and the foregoing text corresponding to the procedures shown in FIG. 5A and FIG. 5C, and for still another example, a part of the procedure shown in FIG. 5A (for example, S009 to S012 in FIG. 5A), the foregoing text corresponding to the part of the procedure shown in FIG. 5A, the procedure shown in FIG. 5B, and the foregoing text corresponding to the procedure shown in FIG. 5B may separately constitute the wireless projection method provided in embodiments of this disclosure.

Figure 12:
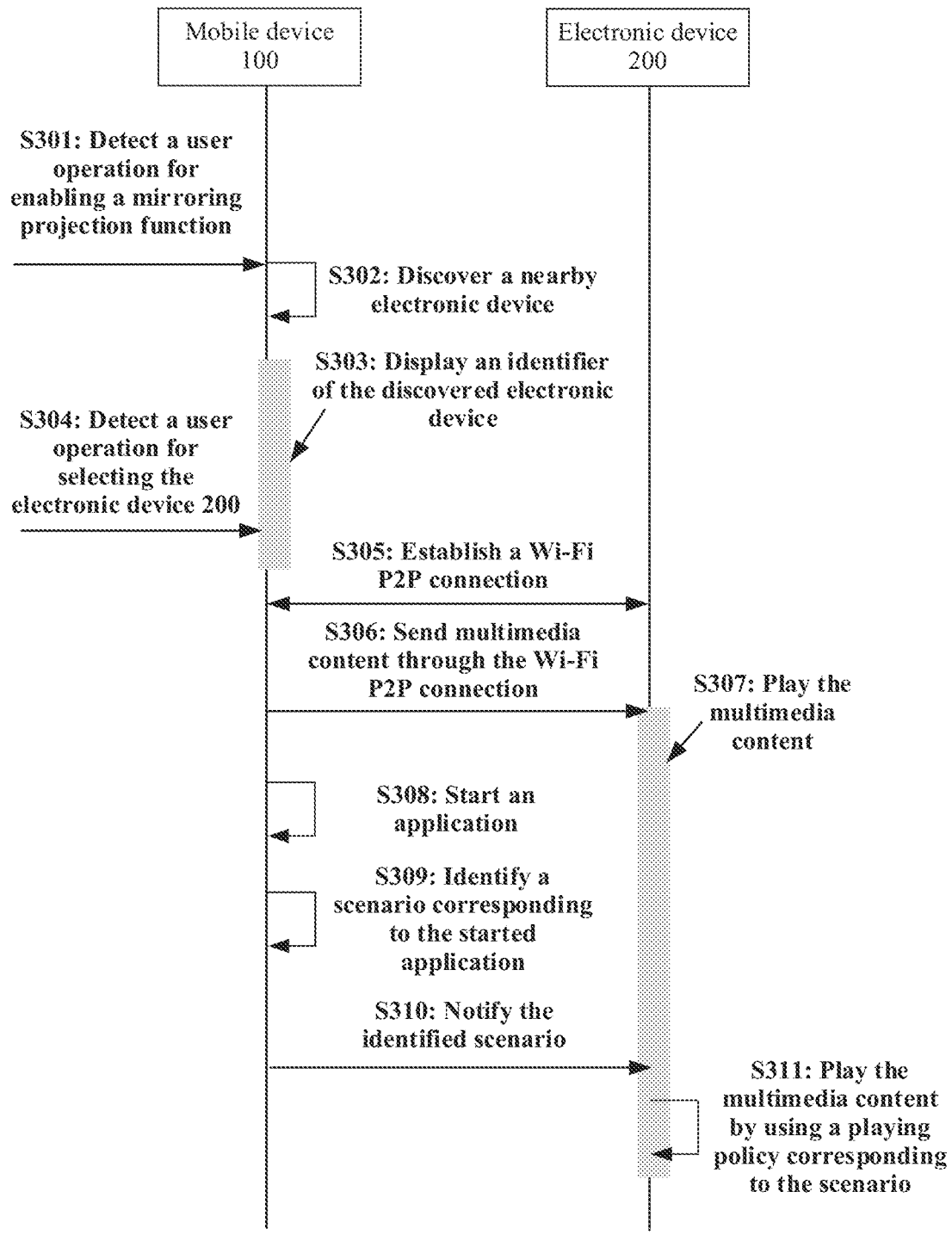
FIG. 12 is a schematic flowchart of another wireless projection method according to an embodiment of this disclosure.

FIG. 12 is a schematic flowchart of another projection method according to an embodiment of this disclosure. As shown in FIG. 12, when a mobile device 100 shares multimedia content with an electronic device 200 based on mirroring projection, the mobile device 100 may identify a current scenario, and notify the electronic device 200 of the scenario. After learning the current scenario, the electronic device 200 adaptively selects a corresponding playing policy based on the scenario to play the multimedia content. The multimedia content shared between the mobile device 100 and the electronic device 200 may be network multimedia content, local multimedia content, or a combination thereof. This is not limited in this disclosure.

As shown in FIG. 12, the method may include the following steps.

S301 to S307 are the same as S001 to S007 in FIG. 5A, and details are not described herein again.

S308: The mobile device 100 starts an application.

The application started by the mobile device 100 may be any installed application. For example, the mobile device 100 may start a video application in response to a user operation performed on the icon 601 of the video application on the home screen 61 shown in FIG. 6A For another example, the mobile device 100 may start a game application in response to a user operation performed on the icon 602 of the game application on the home screen 61 shown in FIG. 6A The video application is an application that provides an audio and video service by using a server. The game application is an application that provides a game service by using a server.

S309: The mobile device 100 identifies a scenario corresponding to the started application.

The mobile device 100 may distinguish different scenarios based on different started applications. For example, when the mobile device 100 starts the video application, the mobile device 100 may identify a scenario of running the video application; or when the mobile device 100 starts the game application, the mobile device 100 may identify a scenario of running the game application.

Specifically, a scenario awareness module or a projection service of the mobile device 100 may learn, in real time or periodically in a manner of S009, or S009 and S010, an application that is run in the foreground, to identify the current scenario.

In some embodiments, distinguishing different scenarios based on started applications is not limited thereto. The mobile device 100 may alternatively distinguish different scenarios according to another policy. This is not limited in embodiments of this disclosure.

S310: The mobile device 100 notifies the electronic device 200 of the identified scenario.

In some embodiments, the mobile device 100 may use a control instruction for using mirroring projection, to carry indication information of the identified scenario, to notify the electronic device 200 of the identified scenario. Miracast is used as an example. The mobile device 100 may use an extended field in an RTSP control instruction to carry the indication information of the identified scenario. For example, if a value of the extended field is 1, it may indicate that the mobile device 100 identifies the scenario of running the video application; or if a value of the extended field is 0, it may indicate that the mobile device 100 identifies the scenario of running the game application.

S311: The electronic device 200 plays the multimedia content by using a playing policy corresponding to the scenario.

When the multimedia content is shared between the mobile device 100 and the electronic device 200 based on mirroring projection, there may be a plurality of playing policies. For example, playing policies corresponding to mirroring projection may include a real-time display sending policy and an audio and video buffer synchronization policy. When the real-time display sending policy is used, after receiving data sent by the mobile device 100, the electronic device 200 directly decodes and plays the data. This preferentially ensures low-latency projection experience of a user in a scenario such as game projection. When the audio and video buffer synchronization policy is used, after receiving encoded data sent by the mobile device 10, the electronic device 200 buffers some data, to ensure smoothness of multimedia content; automatically compares time stamps (presentation time stamps, PTSs) of audio and an image in the multimedia content; and when a difference between the time stamps of the audio and the image exceeds a threshold, triggers an audio and video synchronization processing logic (for example, audio double-speed playing or an image frame loss), to ensure audio-visual synchronization quality when the electronic device 200 plays the multimedia content.

It may be understood that the real-time display sending policy and the audio and video buffer synchronization policy are merely words used in embodiments of this disclosure, meanings represented by the words are recorded in embodiments of this disclosure, and names of the words do not constitute any limitation on embodiments of this disclosure. In addition, in some other embodiments of this disclosure, the real-time display sending policy may also be referred to as another name such as a low-latency fast display sending mode. Similarly, the audio and video buffer synchronization policy mentioned in this embodiment of this disclosure may also be referred to as another name such as a buffer mode in some other embodiments.

For example, Table 1 shows a correspondence between a scenario in which the mobile device 100 is located and a playing policy used by the electronic device 200, on the premise that the mobile device 100 performs wireless projection onto the electronic device 200. As shown in Table 1, the scenario of running the game application may correspond to the real-time display sending policy, and the scenario of running the video application may correspond to the audio and video buffer synchronization policy.

TABLE 1

| Scenario | Playing policy |
| --- | --- |
| Scenario of running the game application | Real-time display sending policy |
| Scenario of running the video application | Audio and video buffer synchronization policy |

In the scenario in which the mobile device 100 runs the game application, real-time performance is a main factor that affects projection experience of the user. Therefore, the real-time display sending policy is more suitable for the scenario of running the game application. In the scenario in which the mobile device 100 runs the video application, projection smoothness and audio-visual synchronization quality are main factors that affect projection experience of the user. Therefore, the audio and video buffer synchronization policy is more suitable for the scenario of running the video application. The real-time display sending policy and the audio and video buffer synchronization policy are not limited thereto. In another embodiment, mirroring projection may further correspond to more other playing policies, for example, an ultra-low latency mode. This is not limited in embodiments of this disclosure. Another playing policy corresponding to mirroring projection may be customized by a person skilled in the art. This is not limited in embodiments of this disclosure. A correspondence between each scenario and a playing policy is not limited in embodiments of this disclosure, either. In some other embodiments, there may be another correspondence. This is not limited in embodiments of this disclosure.

In specific implementation of S311, a projection service in the electronic device 200 may indicate a projection player to play the multimedia content by using the playing policy corresponding to the scenario identified by the mobile device 100.

According to the projection method shown in FIG. 12, when the multimedia content is shared based on mirroring projection, the electronic device 200 may adaptively select, based on the scenario in which the mobile device 100 is located, the corresponding playing policy to play the multimedia content, that is, adjust the playing policy based on an actual scenario. In this way, projection experience of the user can be ensured.

Figure 13A:
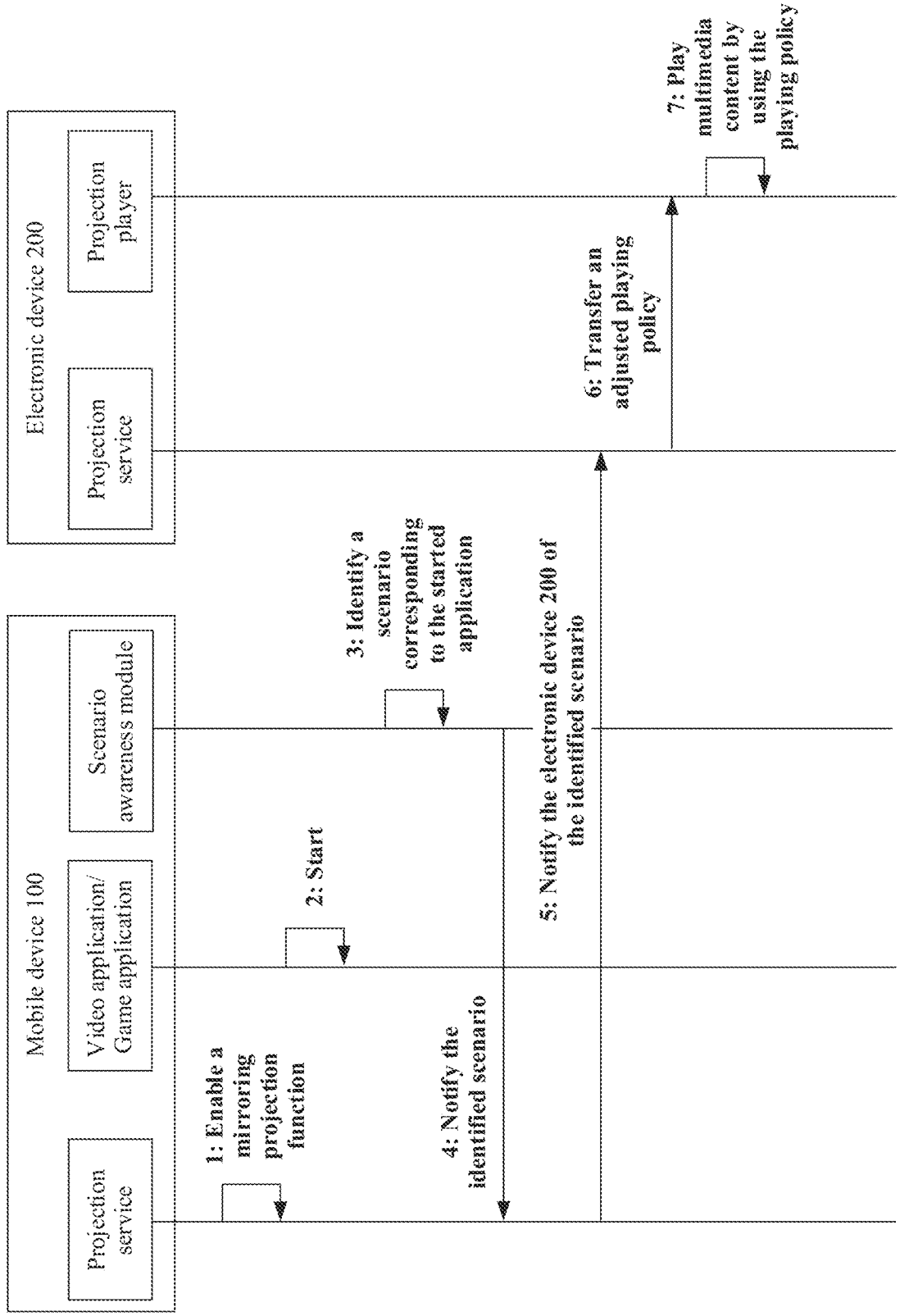
FIG. 13A and FIG. 13B are schematic diagrams of interaction between internal modules of a mobile device and an electronic device in another wireless projection method according to an embodiment of this disclosure.

With reference to the software structure (for example, the software structure shown in FIG. 3B) of the mobile device 100, the following describes in detail a procedure of interaction between internal modules when the mobile device 100 performs the procedure in FIG. 12. It should be noted that, although the software structure shown in FIG. 3B is used as an example for description herein, a person skilled in the art should learn that another operating system (such as Harmony) is also applicable. As shown in FIG. 13A, the following steps may be included.

The mobile device 100 performs step 1 to step 5.

Step 1: The projection service enables a mirroring projection function.

Step 2: Start an application.

Step 3: The scenario awareness module identifies a scenario corresponding to the started application.

For implementation of step 1, refer to operations of the mobile device 100 in S301 to S307 in the method shown in FIG. 12. For implementation of step 2, refer to S308 in the method shown in FIG. 12. For implementation of step 3, refer to S309 in the method shown in FIG. 12.

Step 4: The scenario awareness module notifies the projection service of the identified scenario.

Step 5: The projection service notifies the electronic device 200 of the scenario identified by the scenario awareness module.

Specifically, after learning that the mobile device 100 enables the mirroring projection function and learns the scenario identified by the scenario awareness module, the projection service may notify the electronic device 200 of the scenario.

For implementation of step 5, refer to S310 in the method shown in FIG. 12.

The electronic device 200 performs step 6 and step 7.

Step 6: The projection service determines a playing policy corresponding to the scenario in which the mobile device 100 is located, and transfers the playing policy to the projection player.

Step 7: The projection player plays multimedia content by using the playing policy.

For implementation of steps 6 and 7, refer to S311 in the method shown in FIG. 12.

Figure 13B:
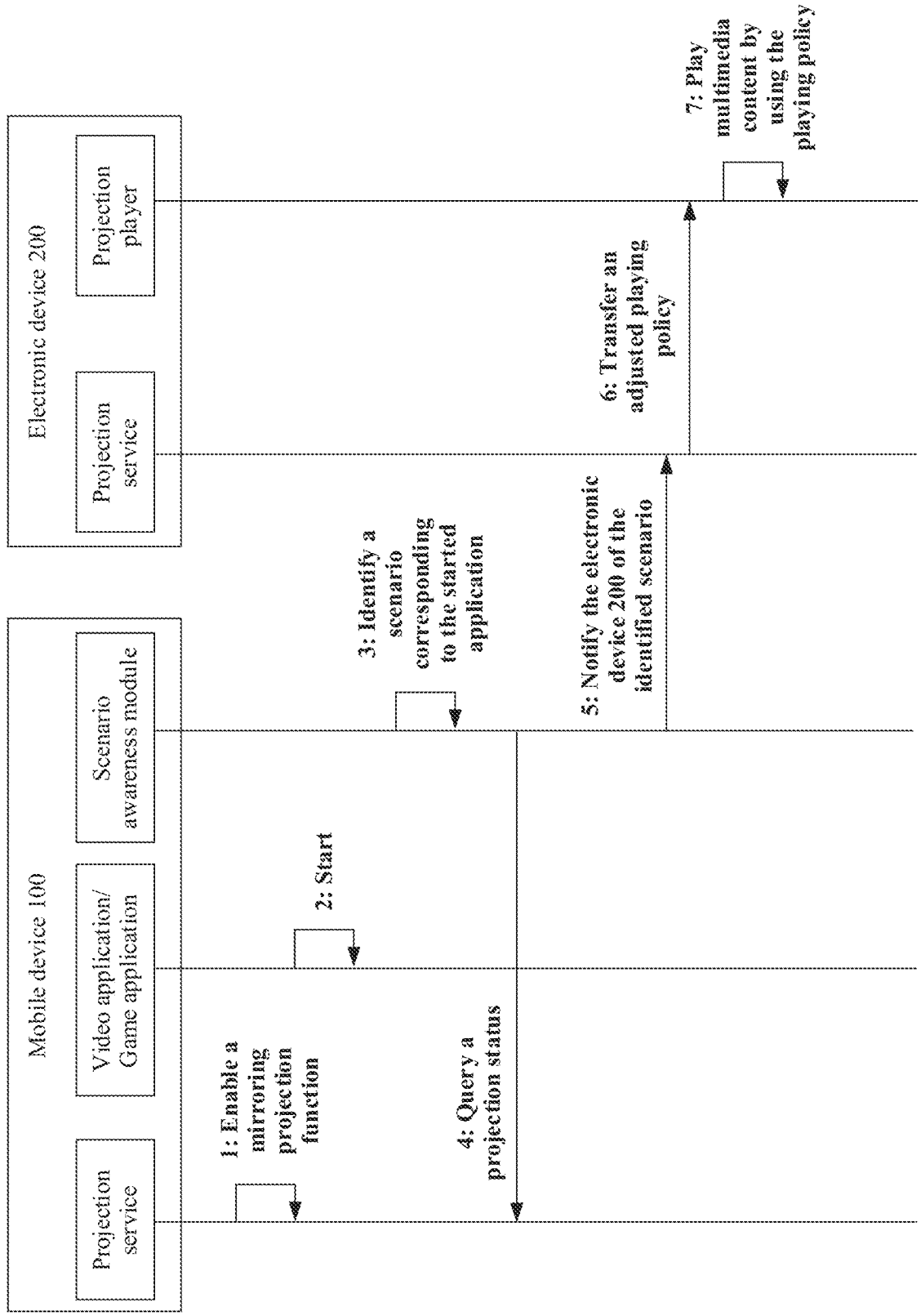

FIG. 13B shows another procedure of interaction between internal modules when the mobile device 100 performs the procedure shown in FIG. 5C. A difference between FIG. 13B and FIG. 13A lies in that in step 4, the scenario awareness module of the mobile device 100 queries a projection status from the projection service, and in step 5, the scenario awareness module notifies the electronic device 200 of the identified scenario.

It may be understood that, in the examples in FIG. 13A and FIG. 13B, a function of the scenario awareness module may be integrated into the projection service. When the function of the scenario awareness module is integrated into the projection service, steps performed by the scenario awareness module in FIG. 13A and FIG. 13B are all performed by the projection service, and steps of interaction between the scenario awareness module and the projection service may also be omitted.

It may be understood that in embodiments of this disclosure, both the procedure shown in FIG. 5B and the procedure shown in FIG. 5C may be implemented in combination with the method shown in FIG. 12, or may be separately implemented.

For example, when the procedure shown in FIG. 5B is implemented in combination with FIG. 12, in a process in which the mobile device 100 shares a network video with the electronic device 200 based on mirroring projection, if the electronic device 200 is connected to a network, that is, the electronic device 200 meets an online projection condition, the mobile device 100 may perform the procedure shown in FIG. 5B; or if the electronic device 200 is not connected to a network, that is, the electronic device 200 does not meet an online projection condition, the mobile device 100 may perform the projection method shown in FIG. 12.

For example, when the procedure shown in FIG. 5C is implemented in combination with FIG. 12, in a process in which the mobile device 100 shares a network video with the electronic device 200 based on mirroring projection, if the electronic device 200 is connected to a network, that is, the electronic device 200 meets an online projection condition, the mobile device 100 may perform the procedure shown in FIG. 5C; or if the electronic device 200 is not connected to a network, that is, the electronic device 200 does not meet an online projection condition, the mobile device 100 may perform the projection method shown in FIG. 12.

All or a part of implementations and embodiments of this disclosure may be randomly and freely combined.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to this disclosure is or are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

A person of ordinary skill in the art may understand that all or a part of the procedures of the methods in the embodiments may be implemented by a computer program instructing relevant hardware. The program may be stored in a computer-readable storage medium. When the program is executed, the procedures of the methods in the embodiments may be performed. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A mobile device comprising: a memory configured to store instructions; and one or more processors coupled to the memory and configured to execute the instructions to cause the mobile device to: run a first multimedia application in a foreground; perform a wireless projection onto a first electronic device in a first wireless projection mode; detect that the first multimedia application belongs to a first-type multimedia application; and in response to detecting that the first multimedia application belongs to the first-type multimedia application, either: automatically output first prompt information for giving a first prompt for switching the first wireless projection mode to a second wireless projection mode; or automatically switch the first wireless projection mode to the second wireless projection mode and perform the wireless projection onto the first electronic device in the second wireless projection mode; and wherein the one or more processors are further configured to execute the instructions to cause the mobile device to: detect that a second multimedia application of a second-type multimedia application is started or the second multimedia application is switched to run in the foreground; in response to detecting that the second multimedia application is started or that the second multimedia application is switched to run in the foreground, either: automatically output second prompt information for giving a second prompt for switching the second wireless projection mode to the first wireless projection mode; or automatically switch the second wireless projection mode to the first wireless projection mode and perform the wireless projection onto the first electronic device in the first wireless projection mode.

2. The mobile device of claim 1, wherein after automatically outputting the first prompt information, the one or more processors are further configured to execute the instructions to cause the mobile device to:
   detect a first user input for switching the first wireless projection mode to the second wireless projection mode;
   automatically output, in response to the first user input, one or more identifiers of one or more electronic devices;
   detect a second user input for selecting an identifier of a second electronic device from the one or more identifiers; and
   in response to the second user input:
     switch the first wireless projection mode to the second wireless projection mode; and
     perform the wireless projection onto the second electronic device in the second wireless projection mode.

3. The mobile device of claim 2, wherein the one or more processors are further configured to execute the instructions to cause the mobile device to:
   detect that a second multimedia application of a second-type multimedia application is started or the second multimedia application is switched to run in the foreground; and
   in response to detecting that the second multimedia application is started or that the second multimedia application is switched to run in the foreground, either:
     automatically output second prompt information for giving a second prompt for switching the second wireless projection mode to the first wireless projection mode; or
     automatically switch the second wireless projection mode to the first wireless projection mode and perform the wireless projection onto the first electronic device in the first wireless projection mode.

4. The mobile device of claim 3, wherein the one or more processors are further configured to execute the instructions to cause the mobile device to:
   detect that the first multimedia application is switched to run in the foreground, a third multimedia application of the first-type multimedia application is started, or the third multimedia application is switched to run in the foreground;
   in response to detecting that the first multimedia application is switched to run in the foreground, that the third multimedia application is started, or that the third multimedia application is switched to run in the foreground, either:
     automatically output third prompt information for giving a third prompt for switching the first wireless projection mode to the second wireless projection mode; or
     automatically switch the first wireless projection mode to the second wireless projection mode and perform the wireless projection onto the first electronic device in the second wireless projection mode.

5. The mobile device of claim 4, wherein the first-type multimedia application is a non-customized video application without a projection initiation capability and the second-type multimedia application is a game application, wherein the first wireless projection mode is a mirroring projection mode and the second wireless projection mode is an online projection mode, wherein the one or more electronic devices comprise the first electronic device; and wherein the first user input or the second user input comprises a touch input or a voice input.

6. The mobile device of claim 4, wherein the first-type multimedia application is a non-customized video application without a projection initiation capability and the second-type multimedia application is a game application, wherein the first wireless projection mode is a mirroring projection mode and the second wireless projection mode is an online projection mode, wherein the one or more electronic devices do not comprise the first electronic device, and wherein the first user input or the second user input comprises a touch input or a voice input.

7. A mobile device comprising: a memory configured to store instructions; and one or more processors coupled to the memory and configured to execute the instructions to cause the mobile device to: perform a wireless projection onto an electronic device in a first wireless projection mode; detect that a first multimedia application of a first-type multimedia application is started; and in response to detecting that the first multimedia application is started, either: automatically output first prompt information for giving a first prompt for switching the first wireless projection mode to a second wireless projection mode; or automatically switch the first wireless projection mode to the second wireless projection mode and perform the wireless projection onto the electronic device in the second wireless projection mode; and wherein the instructions further cause the mobile device to: detect that a second multimedia application of a second-type multimedia application is started or the second multimedia application is switched to run in a foreground; and in response to detecting that the second multimedia application is started or that the second multimedia application is switched to run in the foreground, either: automatically output second prompt information for giving a second prompt for switching the second wireless projection mode to the first wireless projection mode; or automatically switch the second wireless projection mode to the first wireless projection mode and perform the wireless projection onto the electronic device in the first wireless projection mode.

8. A method comprising: running a first multimedia application in a foreground; performing a wireless projection onto a first electronic device in a first wireless projection mode; detecting that the first multimedia application belongs to a first-type multimedia application; and either detecting, in response to detecting that the first multimedia application belongs to the first-type multimedia application, automatically outputting first prompt information for giving a first prompt for switching the first wireless projection mode to a second wireless projection mode; or automatically switching the first wireless projection mode to the second wireless projection mode and perform the wireless projection onto the first electronic device in the second wireless projection mode; further comprising: detecting that a second multimedia application of a second-type multimedia application is started or that the second multimedia application is switched to run in the foreground; and in response to detecting that the second multimedia application is started or that the second multimedia application is switched to run in the foreground, either: automatically outputting second prompt information for giving a second prompt for switching the second wireless projection mode to the first wireless projection mode; or automatically switching the second wireless projection mode to the first wireless projection mode and perform the wireless projection onto the first electronic device in the first wireless projection mode.

9. The method of claim 8, wherein after automatically outputting the first prompt information, the method further comprises:
   detecting a first user input for switching the first wireless projection mode to the second wireless projection mode;
   automatically outputting, in response to the first user input, one or more identifiers of one or more electronic devices;
   detecting a second user input for selecting an identifier of a second electronic device from the one or more identifiers; and
   in response to the second user input:
      switching the first wireless projection mode to the second wireless projection mode; and
      performing the projection onto the second electronic device in the second wireless projection mode.

10. The method of claim 8, further comprising: detecting that the first multimedia application is switched to run in the foreground, a that third multimedia application of the first-type multimedia application is started, or the third multimedia application is switched to run in the foreground; and automatically outputting third prompt information for giving a third prompt for switching the first wireless projection mode to the second wireless projection mode in response to detecting that the first multimedia application is switched to run in the foreground, that the third multimedia application is started, or that the third multimedia application is switched to run in the foreground.

11. The method of claim 8, further comprising: detecting that the first multimedia application is switched to run in the foreground, that a third multimedia application of the first-type multimedia application is started, or that the third multimedia application is switched to run in the foreground; and in response to detecting that the first multimedia application is switched to run in the foreground, that the third multimedia application is started, or that the third multimedia application is switched to run in the foreground: automatically switching the first wireless projection mode to the second wireless projection mode; and performing the wireless projection onto the first electronic device in the second wireless projection mode.

12. A computer program product comprising computer-executable instructions that are stored on a non-volatile computer-readable storage medium and that, when executed by a processor, cause a mobile device to: run a first multimedia application in a foreground; perform a wireless projection onto a first electronic device in a first wireless projection mode; detect that the first multimedia application belongs to a first-type multimedia application; after detecting that the first multimedia application belongs to the first-type multimedia application, either: automatically output first prompt information for giving a first prompt for switching the first wireless projection mode to a second wireless projection mode; or automatically switch the first wireless projection mode to the second wireless projection mode and perform the wireless projection onto the first electronic device in the second wireless projection mode; and wherein after automatically outputting the first prompt information, the computer-executable instructions further cause the mobile device to: detect that a second multimedia application of a second-type multimedia application is started the second multimedia application is switched to run in the foreground; and in response to detecting that the second multimedia application is started or that the second multimedia application is switched to run in the foreground, either: automatically output second prompt information for giving a second prompt for switching the second wireless projection mode to the first wireless projection mode; or automatically switching the second wireless projection mode to the first wireless projection mode and performing the wireless projection onto the first electronic device in the first wireless projection mode.

13. The computer program product of claim 12, wherein after automatically outputting the first prompt information, the computer-executable instructions further cause the mobile device to:
   detect a first user input for switching the first wireless projection mode to the second wireless projection mode;
   automatically output, in response to the first user input, one or more identifiers of one or more electronic devices;
   detect a second user input for selecting an identifier of a second electronic device from the one or more identifiers; and
   in response to the second user input:
      switch the first wireless projection mode to the second wireless projection mode; and
      perform the wireless projection onto the second electronic device in the second wireless projection mode.

14. The computer program product of claim 13, wherein the computer-executable instructions further cause the mobile device to:
   detecting that a second multimedia application of a second-type multimedia application is started or that the second multimedia application is switched to run in the foreground; and in response to detecting that the second multimedia application is started or that the second multimedia application is switched to run in the foreground, either:
automatically output second prompt information for giving a second prompt for switching the second wireless projection mode to the first wireless projection mode; or
automatically switching the second wireless projection mode to the first wireless projection mode and performing the wireless projection onto the first electronic device in the first wireless projection mode.

15. The computer program product of claim 14, wherein the computer-executable instructions further cause the mobile device to:
detecting that the first multimedia application is switched to run in the foreground, that a third multimedia application of the first-type multimedia application is started, or that the third multimedia application is switched to run in the foreground; and
in response to detecting that the first multimedia application is switched to run in the foreground, that the third multimedia application is started, or that the third multimedia application is switched to run in the foreground, either:
automatically outputting third prompt information for giving a third prompt for switching the first wireless projection mode to the second wireless projection mode; or
automatically switching the first wireless projection mode to the second wireless projection mode and performing the wireless projection onto the first electronic device in the second wireless projection mode.

16. The computer program product of claim 15, wherein:
the first-type multimedia application is a non-customized video application without a projection initiation capability and the second-type multimedia application is a game application;
the first wireless projection mode is a mirroring projection mode and the second wireless projection mode is an online projection mode;
the one or more electronic devices comprise the first electronic device; and
the first user input or the second user input comprise a touch input or a voice input.

* * * * *